United States Patent
Roh et al.

(10) Patent No.: US 9,544,030 B2
(45) Date of Patent: Jan. 10, 2017

(54) METHOD AND APPARATUS FOR TRANSCEIVING A DATA FRAME IN A WIRELESS LAN SYSTEM

(71) Applicant: LG ELECTRONICS INC., Seoul (KR)

(72) Inventors: Dong Wook Roh, Anyang-si (KR); Byeong Woo Kang, Anyang-si (KR); Dae Won Lee, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/723,290

(22) Filed: May 27, 2015

(65) Prior Publication Data

US 2015/0256238 A1    Sep. 10, 2015

Related U.S. Application Data

(63) Continuation of application No. 13/879,794, filed as application No. PCT/KR2011/008098 on Oct. 27, 2011, now Pat. No. 9,078,251.

(Continued)

(51) Int. Cl.
*H04B 7/04* (2006.01)
*H04L 1/00* (2006.01)
(Continued)

(52) U.S. Cl.
CPC .......... *H04B 7/0413* (2013.01); *H04B 7/0697* (2013.01); *H04L 1/0025* (2013.01);
(Continued)

(58) Field of Classification Search
CPC .................................................. H04B 7/0413
See application file for complete search history.

(56) References Cited

U.S. PATENT DOCUMENTS

| 2006/0007908 A1* | 1/2006 | Hosur | H04B 7/0678 370/350 |
| 2006/0126513 A1* | 6/2006 | Li | H04L 1/16 370/236 |

(Continued)

FOREIGN PATENT DOCUMENTS

WO    2011/065743    6/2011

OTHER PUBLICATIONS

Perahia, "VHT60 Tutorial", IEEE 802.11-08/0814r1, Jul. 2008, 8 pages.

(Continued)

*Primary Examiner* — Jenee Williams
(74) *Attorney, Agent, or Firm* — Lee Hong Degerman Kang Waimey

(57) ABSTRACT

A method of transmitting a data frame by a transmitter in a WLAN system is provided. The method includes generating a data block including at least one data units respectively transmitted through at least one or more spatial streams to at least one receiver, transmitting first control information to the at least one receiver, transmitting second control information to each receiver, and transmitting the data block to the at least one receiver. The first control information includes a length indicator for the data block, a MIMO indicator indicating whether the data block is for SU-MIMO or MU-MIMO, and a spatial stream indication field including information about the number of the spatial streams. The second control information includes a FEC coding field indicating an encoding scheme applied to the data unit and an MCS field indicating an MCS applied to the data unit.

10 Claims, 38 Drawing Sheets

Related U.S. Application Data

(60) Provisional application No. 61/407,546, filed on Oct. 28, 2010.

(51) Int. Cl.
  *H04B 7/06* (2006.01)
  *H04W 76/04* (2009.01)
  *H04W 72/04* (2009.01)
  *H04W 52/42* (2009.01)
  *H04W 84/12* (2009.01)

(52) U.S. Cl.
  CPC ......... *H04L 1/0041* (2013.01); *H04W 72/042* (2013.01); *H04W 76/041* (2013.01); *H04B 7/0452* (2013.01); *H04B 7/0617* (2013.01); *H04L 2001/0093* (2013.01); *H04W 52/42* (2013.01); *H04W 84/12* (2013.01)

(56) References Cited

U.S. PATENT DOCUMENTS

| | | | | |
|---|---|---|---|---|
| 2006/0176972 A1* | 8/2006 | Kim | ...... | H04L 1/0003 375/267 |
| 2006/0203785 A1* | 9/2006 | Kim | ...... | H04L 1/0003 370/338 |
| 2006/0280134 A1* | 12/2006 | Kwon | ...... | H04L 29/06 370/278 |
| 2006/0280153 A1* | 12/2006 | Kwon | ...... | H04W 74/0808 370/338 |
| 2006/0280154 A1* | 12/2006 | Kwon | ...... | H04L 69/18 370/338 |
| 2006/0280155 A1* | 12/2006 | Kwon | ...... | H04W 74/0816 370/338 |
| 2007/0183515 A1* | 8/2007 | Lim | ...... | H04B 7/0669 375/260 |
| 2007/0230454 A1* | 10/2007 | Ginzburg | ...... | H04L 69/18 370/389 |
| 2007/0270173 A1* | 11/2007 | Niu | ...... | H04B 7/0413 455/522 |
| 2008/0045153 A1* | 2/2008 | Surineni | ...... | H04B 7/0417 455/63.1 |
| 2009/0154427 A1 | 6/2009 | Lee et al. | | |
| 2010/0040158 A1 | 2/2010 | Aggarwal et al. | | |
| 2010/0080173 A1* | 4/2010 | Takagi | ...... | H04L 27/0006 370/328 |
| 2010/0111215 A1* | 5/2010 | Nandagopalan | ...... | H04B 7/0617 375/267 |
| 2010/0159845 A1* | 6/2010 | Kaaja | ...... | H04B 7/088 455/70 |
| 2010/0260060 A1* | 10/2010 | Abraham | ...... | H04L 25/03343 370/252 |
| 2011/0038332 A1* | 2/2011 | Liu | ...... | H04L 1/1685 370/329 |
| 2011/0069778 A1* | 3/2011 | Kim | ...... | H04L 27/2613 375/285 |
| 2011/0103280 A1 | 5/2011 | Liu et al. | | |
| 2011/0176631 A1* | 7/2011 | Tu | ...... | H04B 7/0452 375/267 |
| 2011/0249660 A1* | 10/2011 | Noh | ...... | H04L 5/0023 370/338 |
| 2011/0305176 A1* | 12/2011 | Wentink | ...... | H04L 1/1607 370/310 |
| 2012/0213204 A1* | 8/2012 | Noh | ...... | H04W 72/02 370/331 |
| 2012/0294255 A1* | 11/2012 | Seok | ...... | H04B 7/0452 370/329 |
| 2012/0327914 A1* | 12/2012 | Kang | ...... | H04L 5/0023 370/336 |
| 2014/0226757 A1 | 8/2014 | Oh et al. | | |

OTHER PUBLICATIONS

Syafei, et al., "A Gigabit MIMO WLAN System with International Standardization Strategy", 2009 International Symposium on Intelligent Signal Processing and Communication Systems (ISPACS 2009), Dec. 2009, 4 pages.

\* cited by examiner

METHOD AND APPARATUS FOR TRANSCEIVING A DATA FRAME IN A WIRELESS LAN SYSTEM

CROSS-REFERENCE TO RELATED APPLICATIONS

This application is a continuation of U.S. patent application Ser. No. 13/879,794, filed on Apr. 16, 2013, now U.S. Pat. No. 9,078,251, which is the National Stage filing under 35 U.S.C. 371 of International Application No. PCT/KR2011/008098, filed on Oct. 27, 2011, which claims the benefit of U.S. Provisional Application No. 61/407,546, filed on Oct. 28, 2010, the contents of which are all hereby incorporated by reference herein in their entirety.

TECHNICAL FIELD

The present invention is related to a wireless local area network (WLAN) system, and more specifically, to a method of transmitting and receiving data frames by an access point (AP) and a station (STA).

BACKGROUND ART

Recent advance in information communication (IT) technologies leads to development of various wireless communication technologies. Among others, WLAN is a technology that is based on a wireless frequency technology and that allows for wirelessly accessing the Internet in a home or a specific service providing area by using portable terminals such as personal digital assistants (PDAs), laptop computers, and portable multimedia players (PMPs).

To overcome a weakness of WLAN, i.e., limited communication speed, the IEEE 802.11n standard has been recently established. This standard targets increasing network speed and reliability as well as expanding the operation range of the wireless network. Specifically, the IEEE 802.11n supports a high throughput (HT) in which data processing speed reaches up to 540 Mbps and is based on the MIMO (Multiple Inputs and Multiple Outputs) technology in which a multi-antenna is used in each of the transmit unit and the receive unit so as to optimize data rate while minimizing transmission errors.

As WLAN is spreading over and over and various applications using this are developed, demand for new WLAN systems, which may support a higher data processing rate than that supported by IEEE 802.11n, is growing up. The next-generation WLAN system supporting very high throughput (VHT) is a subsequent version of 802.11n WLAN and is one of new IEEE 802.11 WLAN systems as recently suggested to support a data processing rate of 1 Gbps or more in the MAC service access point (SAP).

A next-generation WLAN system backs up MU-MIMO (Multi User Multiple Input Multiple Output)-based transmission in which a plurality of STAs attempts to simultaneously access the channel in order to efficiently use wireless channels. In such MU-MIMO transmission scheme, an AP may transmit packets to one or more MIMO-paired STAs at the same time.

As various communication services such as smart grid, e-Health, and Ubiquitous are introduced, M2M (Machine to Machine) technologies gain popularity to support the services. A sensor for sensing temperature or moist, a camera, a home appliance such as TVs, a processing machine used in the factory, or vehicles or other large-scale machines may be an element constituting an M2M system. The elements constituting an M2M system may attend data transmission and receipt based on WLAN communication.

An M2M supportive WLAN system may be specified to use a frequency band other than the existing frequency band used for data transmission and receipt. In contrast to a conventional system using a band of 5 GHz, a WLAN system supporting M2M may be set to use a band of 900 MHz.

As configuring an M2M supportive WLAN system, a wireless apparatus uses a frequency band not to overlap the frequency band supported by the existing WLAN system, and thus, may generate and transmit a data frame, i.e., PPDU (PLCP (Physical Layer Convergence Procedure) Protocol Data Unit), without considering backward compatibility. In other words, it is not required to support compatibility with legacy stations (STAs) that operate in the existing WLAN system. Accordingly, when control information for legacy STAs is, upon transmission, included in PPDU in accordance with the existing PPDU transmission/reception scheme, overhead may occur unnecessarily. Therefore, there is a need for an improved PPDU transmission and reception method that may support efficient data exchange in an M2M supportive WLAN system.

DISCLOSURE

Technical Problem

An object of the present invention is to provide a data frame transmission method for supporting data exchange in a new frequency band in a WLAN system and an apparatus supporting the same.

Technical Solution

In an aspect, a method of transmitting a data frame by a transmitter in a WLAN system is provided. The method includes generating a data block including at least one or more data units respectively transmitted through at least one or more spatial streams to at least one or more receivers, transmitting first control information to the at least one or more receivers, wherein the first control information includes a length indicator for the data block, a multiple input multiple output (MIMO) indicator, and a spatial stream indication field, wherein the MIMO indicator indicates whether the data block is for SU (single user)-MIMO or MU (multi user)-MIMO, wherein the spatial stream indication field includes information about the number of the spatial streams, transmitting to each receiver second control information, wherein the second control information includes a forward error correction (FEC) coding field indicating an encoding scheme applied to the data unit and a modulation and coding scheme (MCS) field indicating an MCS applied to the data unit, and transmitting the data block to the at least one or more receivers.

When the MIMO indicator indicates that the data block is transmitted by MU-MIMO transmission, the spatial stream indication field may include at least one or more subfields, each subfield indicating a number of spatial streams assigned to each receiver for transmitting each data unit.

When the MIMO indicator indicates that the data block is transmitted by MU-MIMO transmission, the spatial stream indication field may be set to an index value mapped with information indicating the number of spatial streams assigned to each receiver for transmitting each data unit.

The FEC coding field may indicate one of BCC (Binary Convolution Coding) encoding and LDPC (Low Density Parity Check) encoding.

The method may further include transmitting a training sequence used for estimating a MIMO channel between the transmitter and at least one receiver before transmitting the second control information and after transmitting the first control information.

The length indicator may indicate duration required to transmit the data block.

The second control information may further include a second length indicator for the data block.

A length of each data unit may be defined by a combination of a bit sequence constituting the length indicator and a bit sequence constituting the second length indicator.

In an aspect, a wireless device is provided. The wireless device includes a transceiver transmitting and receiving a data block and a processor operatively coupled with the transceiver, wherein the processor is configured for generating a data block including at least one or more data units respectively transmitted through at least one or more spatial streams to at least one or more receivers, transmitting first control information to the at least one or more receivers, wherein the first control information includes a length indicator for the data block, a multiple input multiple output (MIMO) indicator, and a spatial stream indication field, wherein the MIMO indicator indicates whether the data block is for SU (single user)-MIMO or MU (multi user)-MIMO, wherein the spatial stream indication field includes information about the number of the spatial streams, transmitting to each receiver second control information, wherein the second control information comprising a forward error correction (FEC) coding field indicates an encoding scheme applied to the data unit and a modulation and coding scheme (MCS) field indicating an MCS applied to the data unit, and transmitting the data block to the at least one or more receivers.

Advantageous Effects

The present invention suggests a format including control information required in a new WLAN system supporting an M2M (Machine to Machine) application except for control information required for transmission/reception of frames in a legacy station (L-STA) in a WLAN system not supporting part of backward compatibility. Since data frames are subjected to transmission and reception with unnecessary legacy control information excluded, unnecessary overhead may be prevented from being generated.

A format as suggested includes a signal field including control information to be able to support MU-MIMO (Multi User-Multiple Input Multiple Output) transmission. Through the MU-MIMO transmission, the overall throughput of the M2M supportive WLAN system may be enhanced.

In the MU-MIMO transmission, a signal field is provided including different sub signal fields, one of which contains common control information commonly required for a plurality of MU-MIMO paired STAs and another of the sub signal fields containing dedicated control information required for each STA. For this, STAs targeted for transmission may receive all of the common/dedicated control information and data and may perform data exchange, and other STAs may determine that data is not the data therefor through the common control information only. By doing so, the STAs may enhance power management efficiency which is an issue of M2M.

DESCRIPTION OF DRAWINGS

FIGS. 1 to 33 are views illustrating examples of a signal field format according to an embodiment of the present invention.

MODE FOR INVENTION

Figure 1:
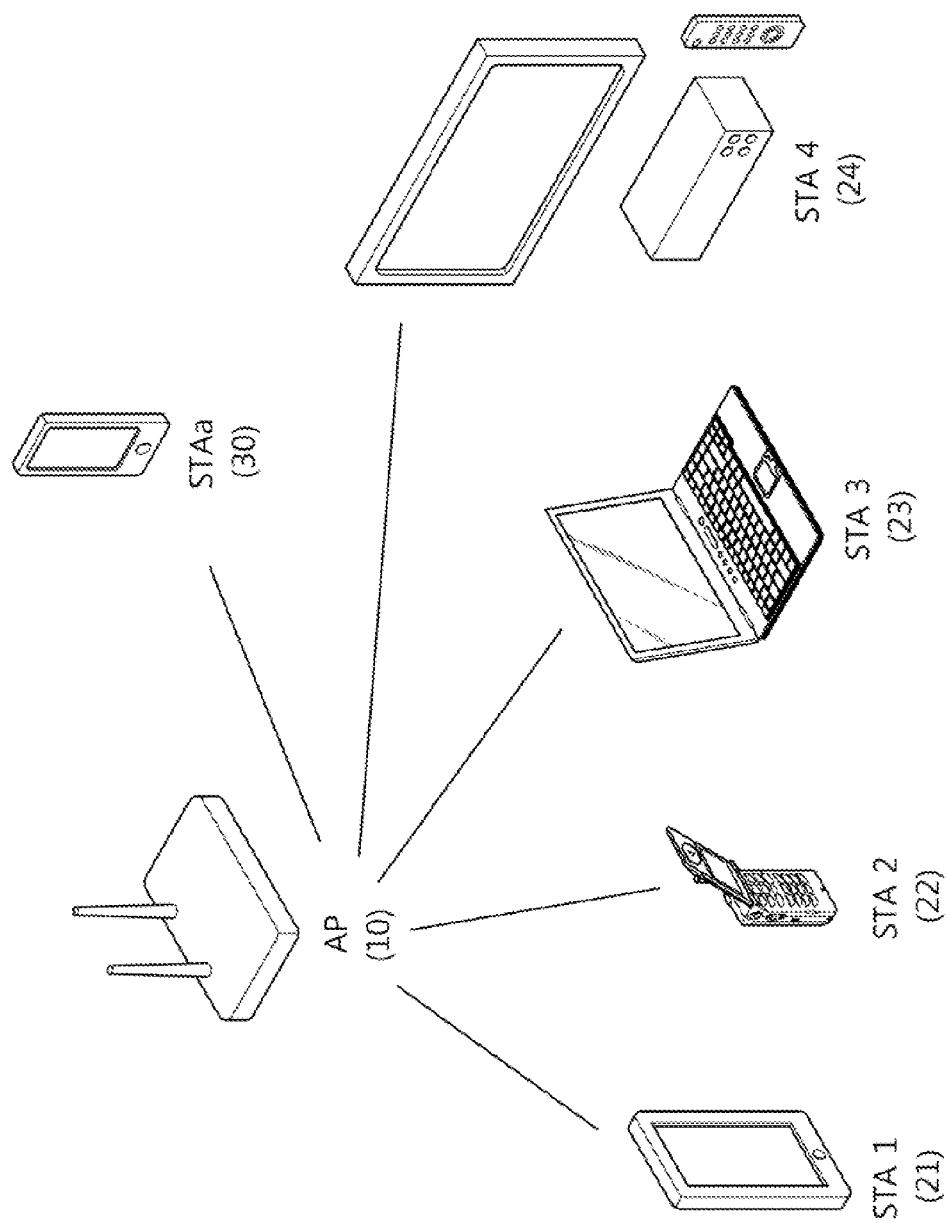
FIG. 1 is a view illustrating a configuration of a wireless local area network (WLAN) system according to an embodiment of the present invention.

FIG. 1 is a view illustrating a configuration of a wireless local area network (WLAN) system according to an embodiment of the present invention.

Referring to FIG. 1, the WLAN system includes one or more basic service sets (BSSs). The BSS is a set of stations (STAs) which may communicate with each other in successful synchronization with each other and is not a concept indicating a specific area.

An infrastructure BSS includes one or more non-AP stations non-AP STA1, non-AP STA2, non-AP STA3, non-AP STA4, and non-AP STA5, access points (APs) providing a distribution service, and a distribution system (DS) connecting the plurality of APs to one another. In the infrastructure BSS, an AP manages non-AP STAs in the BSS.

On the contrary, an independent BSS (IBSS) is a BSS operating in an Ad-Hoc mode. The IBSS does not include any AP and thus lacks a centralized management entity. That is, in the IBSS, non-AP STAs are managed in a distributed manner. In the IBSS, all the STAs may be constituted of mobile STAs and are not permitted to access the DS, thus constituting a self-contained network.

The STA is any functioning medium including medium access control (MAC) following the IEEE (Institute of Electrical and Electronics Engineers) 802.11 standard and a physical layer interface for a wireless medium, and in the broad concept includes both AP and non-AP station.

The non-AP STA is an STA that is not an AP. The non-AP STA may be referred to by other names such as mobile terminal, wireless device, wireless transmit/receive unit (WTRU), user equipment (UE), mobile station (MS), mobile subscriber unit or simply user. For ease of description, the non-AP STA is hereinafter referred to as STA.

The AP is a functioning medium providing access to the DS via a wireless medium for an STA associated with the AP. In the infrastructure BSS including the AP, communication between STAs is basically performed via the AP, but when a direct link is established, direct communication between the STAs may also be possible. The AP may be also called central controller, base station (BS), node-B, BTS (Base Transceiver System) or site controller.

A plurality of infrastructure BSSs including the BSSs shown in FIG. 1 may be connected to one another through a distribution system (DS). The plurality of BSSs connected to one another through the DS is referred to as an extended service set (ESS). APs and/or STAs included in the ESS may communicate with each other, and in the same ESS, an STA may shift from one BSS to another BSS while maintaining seamless communication.

In the WLAN system following the IEEE 802.11 standard, a basic access mechanism of MAC (Medium Access Control) is a CSMA/CA (Carrier Sense Multiple Access with Collision Avoidance) mechanism. The CSMA/CA mechanism is also called distributed coordination function (DCF) of IEEE 802.11 MAC and basically employs "listen before talk" access mechanism. According to such type of access mechanism, an AP and/or an STA, before initiating transmission, senses a wireless channel or medium. As a result of the sensing, if the medium is determined to be in an idle status, packet transmission is started through the corresponding medium. In contrast, when the medium is determined to be in an occupied status, the corresponding AP and/or STA sets a delay period for medium access without initiating its own transmission and stands by.

The CSMA/CA mechanism includes virtual carrier sensing as well as physical carrier sensing for the AP and/or STA to directly sense the medium. The virtual carrier sensing is to compensate for a problem that may occur involving medium access such as hidden node problems. For purposes of virtual carrier sensing, the WLAN system uses a network allocation vector (NAV). The NAV is a value by which an AP and/or STA to use a current medium or to have a right to use the current medium indicates a time remaining until this medium turns into a usable status to another AP and/or STA. Accordingly, the value set as the NAV corresponds to a period during which the medium is scheduled to be used by the AP and/or STA transmitting the corresponding packet.

The IEEE 802.11 MAC protocol, together with the DCF, provides an HCF (Hybrid Coordination Function) that is based on a PCF (Point Coordination Function) of periodically performing polling so that all the receiving APs and/or STAs may receive data packets by a polling-based synchronous access scheme and the DCF. The HCF has HCCA (HCF Controlled Channel Access) using non-competition-based channel access scheme using a polling mechanism and EDCA (Enhanced Distributed Channel Access) using competition-based access scheme for a provider to provide multiple users with data packets. The HCF includes a medium access mechanism for enhancing QoS (Quality of Service) of WLAN and may transmit QoS data during both a contention period (CP) and a contention-free period (CFP).

Figure 2:
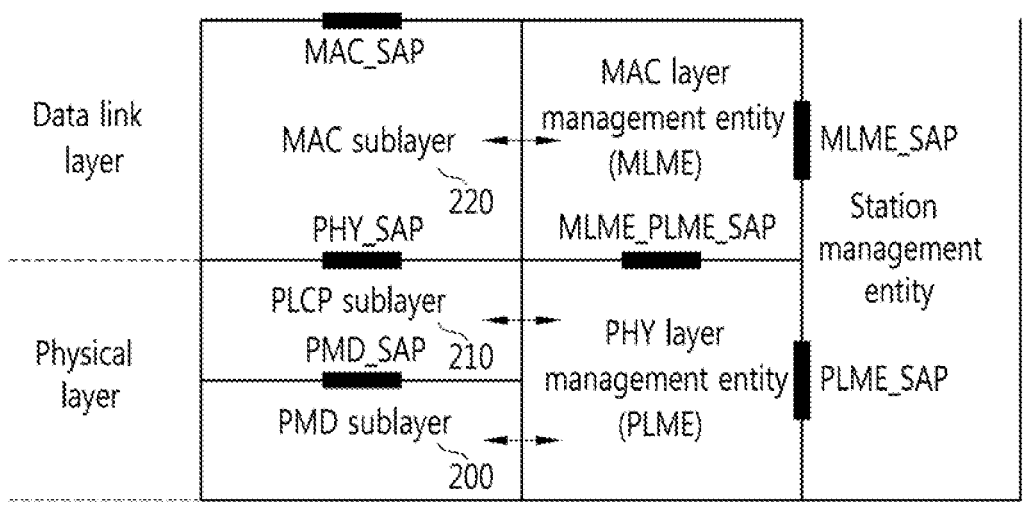
FIG. 2 is a view illustrating a physical layer architecture of a WLAN system supported by IEEE 802.11.

FIG. 2 is a view illustrating a physical layer architecture of a WLAN system supported by IEEE 802.11.

The physical layer (PHY) architecture of IEEE 802.11 consists of a PLME (PHY Layer Management Entity), a PLCP (Physical Layer Convergence Procedure) sublayer 210, and a PMD (Physical Medium Dependent) sublayer 200. The PLME cooperates with an MLME (MAC Layer Management Entity) and provides a function of managing the physical layer. The PLCP sublayer 210 transfers an MPDU (MAC Protocol Data Unit) received from an MAC sublayer 220 to a sublayer according to an instruction of the MAC layer between the MAC sublayer 220 and the PMD sublayer 200 or transfers a frame coming from the PMD sublayer 200 to the MAC sublayer 220. The PMD sublayer 200 is a PLCP lower layer and enables a physical layer entity to be transmitted/received between two stations via a wireless medium. The MPDU transferred from the MAC sublayer 220 is referred to as PSDU (Physical Service Data Unit) in the PLCP sublayer 210. The MPDU is similar to the PSDU, but in case an A-MPDU (aggregated MPDU) obtained by aggregating a plurality of MPDUs is transferred, each MPDU may be different from the PSDU.

The PLCP sublayer 210 adds an additional field including necessary information by a physical layer transceiver in the process of receiving the PSDU from the MAC sublayer 220 and transferring it to the PMD sublayer 200. At this time, the added field may be a PLCP preamble in the PSDU, a PLCP header, and tail bits necessary to get the convolution encoder back to the zero state. The PLCP preamble plays a role to enable the receiver to prepare for a sync function and antenna diversity before the PSDU is transmitted. The data fields may include padding bits in the PSDU, a service field including a bit sequence for initializing the scrambler, and a coded sequence obtained by encoding a bit sequence added with tail bits. At this time, as an encoding scheme, one of BCC (Binary Convolutional Coding) encoding and LDPC (Low Density Parity Check) encoding may be selected depending on encoding schemes supported by the STA receiving the PPDU. In the PLCP header is included a field containing information for the PPDU (PLCP Protocol Data Unit) to be transmitted, and this will be described below in more detail with reference to FIG. 3.

The PLCP sublayer 210 adds the above-described fields to the PSDU to generate the PPDU (PLCP Protocol Data Unit) and transmits the PPDU to the receiving station via the PMD sublayer. The receiving station receives the PPDU, obtains information necessary for restoring data from the PLCP preamble and the PLCP header, and performs restoration.

The WLAN system supports a more continuous 160 MHz band transmission channel and a more non-continuous 80+80 MHz band transmission channel so as to support a higher throughput. Further, it supports an MU-MIMO (Multi User-Multiple Input Multiple Output) transmission scheme. In the WLAN system supportive of the MU-MIMO transmission scheme, an AP and/or an STA to transmit data may transmit data packets to at least one or more receiving STAs as MU-MIMO paired at the same time.

Referring back to FIG. 1, in the WLAN system illustrated in FIG. 1, AP 10 may simultaneously transmit data to an STA group including at least one or more STAs among a plurality of STAs 21, 22, 23, 24, and 30 associated therewith. In FIG. 1 the AP performs MU-MIMO transmission to the STAs, for example. However, in a WLAN system supporting TDLS (Tunneled Direct Link Setup) or DLS (Direct Link Setup) or mesh network, an STA to transmit data may transmit the PPDU to a plurality of STAs using an MU-MIMO transmission scheme. Hereinafter, an example in which an AP transmits the PPDU to a plurality of STAs in accordance with an MU-MIMO transmission scheme is described.

Data to be transmitted to each STA may be transmitted through spatial streams different from each other. A data packet transmitted by AP 10 is the PPDU or a data field included in the PPDU as generated and transmitted from the physical layer in the WLAN system and may be referred to as frame. That is, the data field included in the PPDU for SU-MIMO and/or MU-MIMO may be denoted MIMO packet. In an embodiment of the present invention, the transmission target STA group which is MU-MIMO paired with AP 10 is assumed as a group of STA1 21, STA2 22, STA3 23, and STA4 24. At this time, a specific STA in the transmission target STA group may be assigned with no spatial stream and thus data transmission may be not carried out. Meanwhile, a STAa 30 is assumed as a STA that is coupled with the AP but that is not included in the transmission target STA group.

In the WLAN system, an identifier may be assigned to the transmission target STA group to support MU-MIMO transmission, and this identifier is referred to as group ID. The AP transmits a group ID management frame including group definition information for assigning the group ID to STAs supporting MU-MIMO transmission. The group ID is assigned to the STAs through the group ID management frame before the PPDU is transmitted. One STA may be assigned with a plurality of group IDs.

Table 1 below shows information elements included in the group ID management frame:

TABLE 1

| Order | information |
|---|---|
| 1 | category |
| 2 | VHT action |
| 3 | membership status |
| 4 | spatial stream position |

The category field and the VHT action field are set to identify that a corresponding frame is a management frame and is a group ID management frame used in a next-generation WLAN system supporting MU-MIMO.

As in Table 1, the group definition information includes membership status information indicating whether it belongs to a specific group ID and spatial stream position information indicating a position where a spatial stream set of a corresponding STA is located in the overall spatial stream according to the MU-MIMO transmission in case it belongs to the corresponding group ID.

Since one AP manages a plurality of group IDs, the membership status information provided to one STA needs to indicate whether the STA belongs to each of the group IDs managed by the AP. Accordingly, the membership status information may be provided as an array of subfields indicating whether it belongs to each group ID. The spatial stream position information indicates the position for each group ID and thus may be presented as an array of subfields indicating the position of the spatial stream set occupied by the STA for each group ID. Further, the membership status information and the spatial stream position information for one group ID may be able to be implemented in one subfield.

In case the AP transmits the PPDU to the plurality of STAs through the MU-MIMO transmission scheme, the AP includes, as control information, information indicating the group ID in the PPDU. When the STA receives the PPDU, the STA verifies the group ID and identifies whether the STA is a member STA in the transmission target STA group. If it is identified that the STA is a member of the transmission target STA group, the position where the spatial stream set transmitted to the STA is located in the overall spatial stream may be identified. The PPDU includes information on the number of spatial streams assigned to the receiving STA, and thus, the STA may receive data by figuring out the spatial streams assigned thereto.

Figure 3:
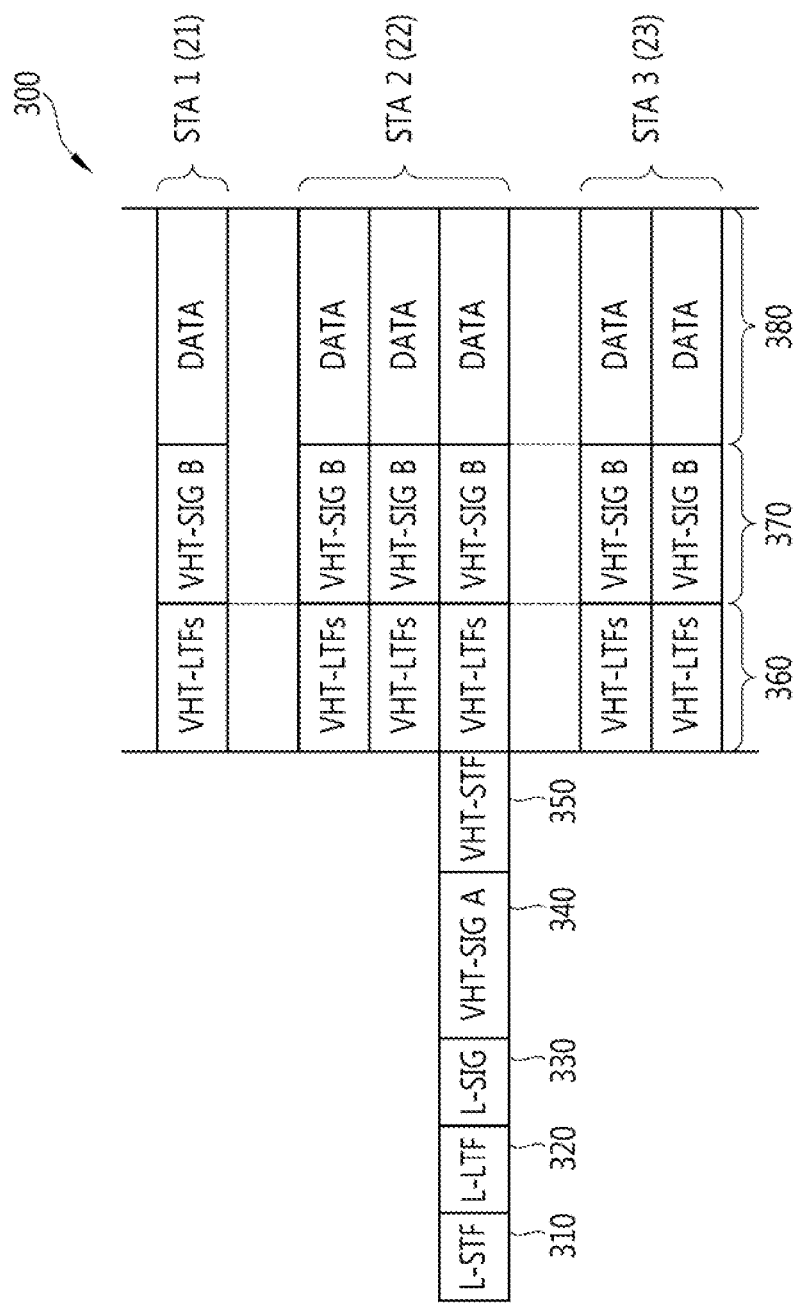
FIG. 3 is a view illustrating an exemplary PPDU format used in a WLAN system.

FIG. 3 is a view illustrating an exemplary PPDU format used in a WLAN system.

Referring to FIG. 3, a PPDU 300 may include an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sublayer constituting a PHY adds necessary information to the PSDU transferred from the MAC layer to generate data field 380 and adds fields such as L-STF 310, L-LTF 320, L-SIG 330, VHT-SIGA field 340, VHT-STF 350, VHT-LTF 360, and VHT-SIGB 370 to generate PPDU 300. Then, the PLCP sublayer transmits PPDU 300 to one or more STAs through the PMD sublayer constituting the PHY.

L-STF 310 is used for frame timing acquisition, AGC (Automatic Gain Control) convergence, and coarse frequency acquisition.

L-LTF 320 is used to estimate a channel for demodulation of L-SIG field 330 and VHT-SIGA field 340.

L-SIG field 330 is used for the L-STA to receive and interpret PPDU 300 to obtain data. L-SIG field 330 includes a rate subfield, a length subfield, a parity bit, and a tail field. The rate subfield is set as a value indicating a bit rate for data to be currently transmitted.

The length subfield is set as a value indicating an octet length of a PSDU requesting that the MAC layer perform transmission to the PHY layer. At this time, a parameter related to information on the octet length of the PSDU, L-LENGTH parameter, is determined based on a TXTIME parameter which is a parameter related to a transmission time. TXTIME represents a transmission time determined by the PHY layer for transmission of the PPDU including the PSDU corresponding to a transmission time requested by the MAC layer for transmission of the PSDU (Physical Service Data Unit). Accordingly, since the L_LENGTH parameter is related to time, the length subfield included in L-SIG 330 includes information related to a transmission time.

VHT-SIGA field 340 is a field related to common control information necessary for STAs receiving the PPDU and includes signal information or control information for interpreting the received PPDU 300. VHT-SIGA field 340 includes channel bandwidth information used for PPDU transmission, information indicating which one of SU or MU-MIMO is used to transmit the PPDU, information indicating a transmission target STA group of a plurality of STAs MU-MIMO paired with the AP in case the transmission scheme is MU-MIMO, information on a spatial stream assigned to each STA included in the transmission target STA group, identification information related with whether STBC (Space Time Block Coding) is used, and information relating to a short GI (Guard Interval) of a transmission target STA.

The information indicating the MIMO transmission scheme and information indicating the transmission target STA group may be implemented as one piece of MIMO indicating information, for example, as a group ID. The group ID may be set as a value having a specific range. In the range, a specific value indicates an SU-MIMO transmission scheme, and the other values may be used as an identifier for a corresponding transmission target STA group in case PPDU 300 is transmitted by the MU-MIMO transmission scheme.

If the group ID indicates that the corresponding PPDU 300 is transmitted through the SU-MIMO transmission scheme, the VHT-SIGA field 340 includes coding indication information indicating whether the coding scheme applied to the data field is BCC (Binary Convolution Coding) or LDPC (Low Density Parity Check) coding and MCS (Modulation Coding Scheme) information for a channel between a transmitter and a receiver. Further, VHT-SIGA field 340 may include AID of a transmission target STA of the PPDU and/or a partial AID including some bit sequence of the AID.

If the group ID indicates that the corresponding PPDU 300 is transmitted through the MU-MIMO transmission scheme, VHT-SIGA field 340 includes coding indication information indicating whether a coding scheme applied to the data field intended to be transmitted to the MU-MIMO paired receiving STAs is BCC or LDPC coding. In such case, MCS (Modulation Coding Scheme) information for each STA may be included in VHT-SIGB field 370.

VHT-STF 350 is used to enhance performance of AGC estimation when performing MIMO transmission.

VHT-LTF 360 is used for a STA to estimate an MIMO channel. Since the next-generation WLAN system supports MU-MIMO, as many VHT-LTFs 360 as the number of spatial streams over which PPDU 300 is transmitted may be set. Additionally, full channel sounding is supported, and when this is performed, the number of VHT LTFs may be further increased.

VHT-SIGB field 370 includes dedicated control information for a plurality of MIMO paired STAs to receive PPDU 300 and obtain data. Accordingly, only when the common control information included in VHT-SIGB field 370 indicates that the currently received PPDU 300 has been MU-MIMO transmitted, the STA may be designed to decode VHT-SIGB field 370. On the contrary, in case the common control information indicates that the currently received PPDU 300 is only for a single STA (including SU-MIMO), the STA may be designed to not decode VHT-SIGB field 370.

VHT-SIGB field 370 includes information on the MCS (Modulation and Coding Scheme) for each STA and information on the rate matching. Further, VHT-SIGB field 370 includes information indicating the length of PSDU included in the data field for each STA. The information indicating the length of the PSDU is information indicating the length of the bit sequence of the PSDU and may indicate the length in the unit of octet. The size of VHT-SIGB field 370 may vary depending on the channel bandwidth used for the PPDU and the type of MIMO transmission (MU-MIMO or SU-MIMO).

Data field 380 includes data intended to be transmitted to the STA. Data field 380 includes a service field for initializing a scrambler and a PSDU (PLCP Service Data Unit) where the MPDU (MAC Protocol Data Unit) is transmitted in the MAC layer, a tail field including a bit sequence necessary to get the convolution encoder back to the zero state, and padding bits for standardizing the length of the data field.

Meanwhile, to support an M2M (Machine to Machine) application, a WLAN system attempts to back up various communication services such as smart grid, e-health, and ubiquitous. Accordingly, sensors for sensing temperature or moist, cameras, home appliances such as TVs, processing machines in the factory, vehicles, and other large-scale machines may also be elements constituting a WLAN system supporting M2M. The M2M supportive WLAN system has the following features:

1) large number of STAs: M2M assumes that in contrast to the existing network a number of STAs are present in a BSS. This is because sensors installed in homes or companies as well as devices owned by an individual are all considered. Thus, a good number of STAs may be connected to one AP.

2) low traffic load per STA: since an M2M terminal has a traffic pattern of collecting and reporting ambient information, the information need not be sent often and the amount thereof is small as well.

3) uplink-centered communication: M2M typically has an architecture of receiving a command over downlink, taking an action, and reporting data over uplink. The main data is generally transmitted over uplink, and M2M supportive systems stay centered on the uplink.

4) power management of STA: since an M2M terminal is primarily battery powered and is in many cases difficult for a user to recharge often. Accordingly, a power management method is required to minimize battery's power consumption.

5) automatic restoration function: an apparatus constituting an M2M system is difficult for people to manipulate in a certain circumstance, and thus, requires a self-restoring function.

Meanwhile, it is specified that an M2M supportive WLAN system is able to use a lower channel band than 6 GHz that is supported by an existing WLAN system. More specifically, it may be specified that a channel band not more than 1 GHz may be used. Because of using a channel band other than that used in the existing system, an M2M supportive WLAN system may be relatively free in view of backward compatibility.

In the M2M supportive WLAN system, data transmission/reception of a legacy station (L-STA) may not be supported. Here, the L-STA means an STA that transmits and receives data based on L-STF 310, L-LTF 320, and L-SIG field 330 in the PPDU 300 format. Accordingly, in case data exchange is conducted using the PPDU format as shown in FIG. 3, among the types of the control information included in L-SIG field 330, the control information for the L-STA only causes unnecessary overhead.

For the M2M supportive WLAN system to support MU-MIMO transmission of the AP and/or the STA, the control information included in a training field for the MIMO channel such as VHT-SF 350 and VHT-LTF 360 of the PPDU format shown in FIG. 3, VHT-SIGA field 340, and VHT-SIGB field 370 needs to be selectively included in a new PPDU format. To meet such system demand, the M2M supportive WLAN system is required to provide a data transmission/reception method based on the new PPDU format. More specifically, the signal fields (VHT-SIGA, VHT-SIGB) included in the PPDU need to be modified.

The format of a PPDU that may be transmitted or received, according to an embodiment of the present invention, will now be described. More specifically, a new PPDU format is suggested by taking specific examples of a VHT-SIGA field and a VHT-SIGB field. For ease of description, the M2M supportive WLAN system is hereinafter referred to simply as WLAN system.

Figure 4:
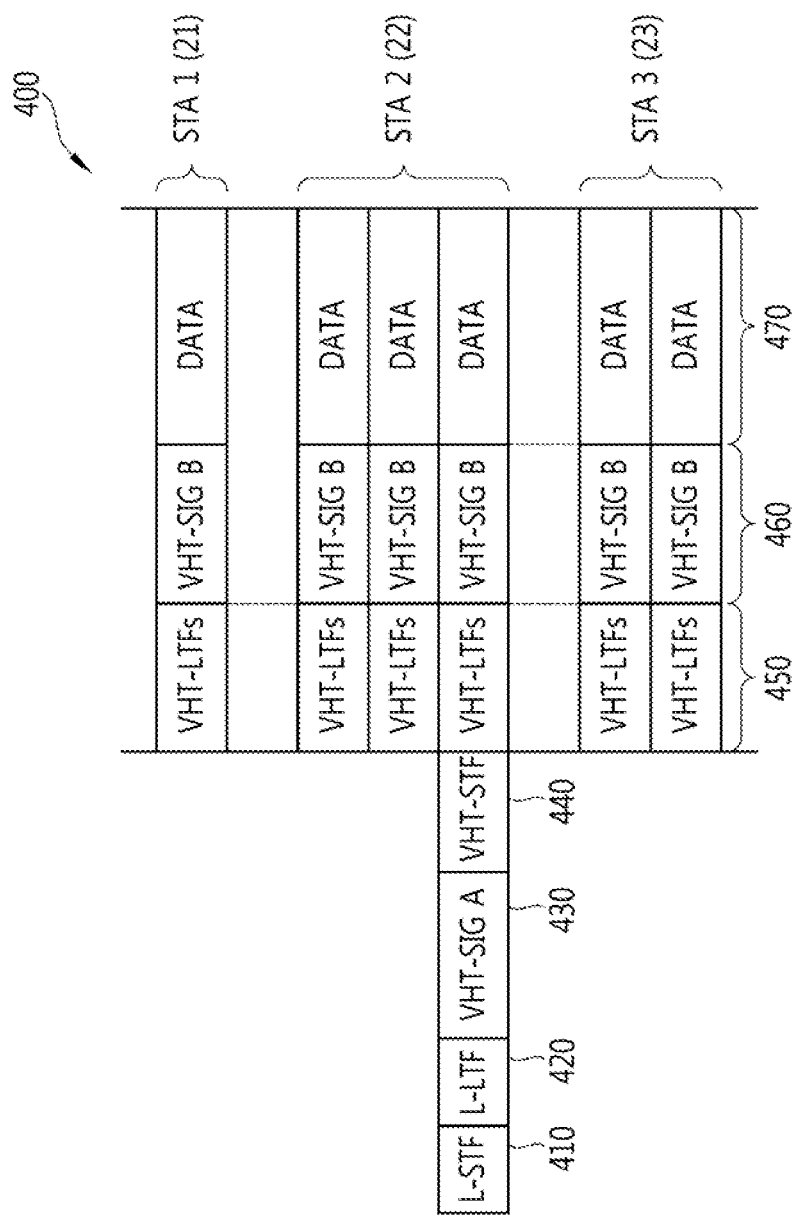
FIG. 4 shows a PPDU format that may be applicable to an embodiment of the present invention.

FIG. 4 shows a PPDU format that may be applicable to an embodiment of the present invention.

Referring to FIG. 4, a PPDU 400 includes an L-STF field 410, an L-LTF field 420, a VHT-SIGA field 430, a VHT-STF field 440, a VHT-LTF field 450, a VHT-SIGB field 460, and a data field 470.

L-STF field 410 is used for frame timing acquisition, AGC convergence, and coarse frequency acquisition. L-LTF field 420 is used to estimate a channel for decoding VHT-SIGA field 430.

VHT-STF field 440 is used to enhance performance of AGC estimation when performing MIMO transmission. VHT-LTF field 450 is used for an STA to estimate an MIMO channel. VHT-LTF field 450 may be set as VHT-LTF 360 of PPDU 300 shown in FIG. 3.

Data field 470 includes a PSDU generated in the MAC layer and a PHY layer padding bit sequence, a service field, and a tail field. In MU-MIMO transmission, data field 470 is transmitted for each transmission target STA and is transmitted through at least one or more spatial streams. Accordingly, data field 470 may be subjected to precoding and beamforming before being transmitted.

A signal field including VHT-SIGA field 430 and VHT-SIGB field 460 includes control information necessary for receiving STAs receiving PPDU 400 from a transmitting STA to receive PPDU 400 and to demodulate and decode data field 470, thereby obtaining the data. VHT-SIGA field 430 include common control information that may be commonly applicable to the receiving STAs, and VHT-STF field 440 includes dedicated control information that may be applicable to each STA alone. Hereinafter, VHT-SIGA field 430 and VHT-SIGB field 460 are described in detail with reference to drawings.

Figure 5:
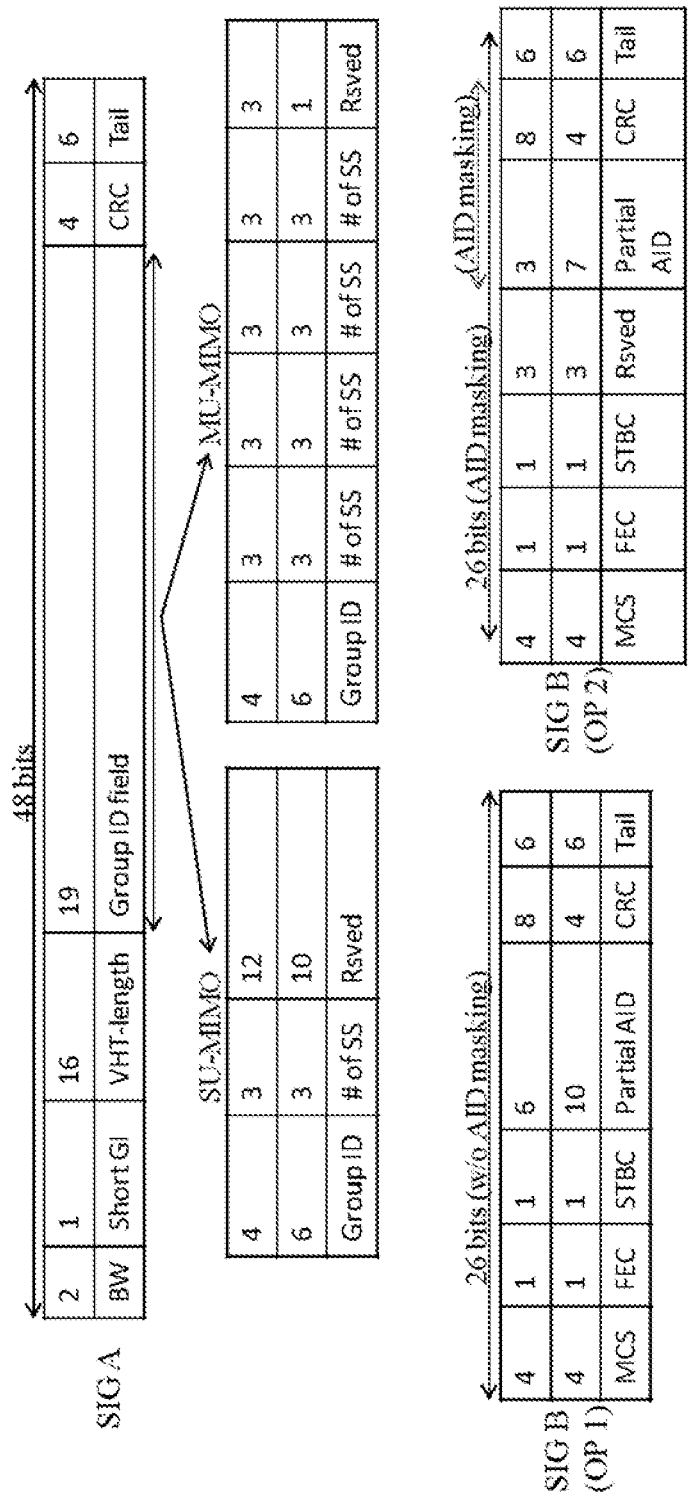

FIG. 5 is a view illustrating a first example of a signal field format according to an embodiment of the present invention.

Referring to FIG. 5, the VHT-SIGA field includes a BW (bandwidth) field, a short GI (guard interval) field, a VHT-length field, a group ID field, a CRC field, and a tail field.

The BW field indicates a bandwidth of a channel over which a PPDU is transmitted. The BW field may be set to indicate 20 MHz, 40 MHz, 80 MHz, 160 MHz, or 80+80 MHz.

The short GI field is set to indicate whether a short GI is used.

The CRC field includes a CRC bit sequence for CRC (cyclic redundancy check).

The tail field includes a tail bit sequence necessary to get the state of the convolution encoder back to the zero state.

The VHT-length field may be set to include a length subfield and a rate subfield of L-SIG field 330 in FIG. 3. A PPDU 500 shown in FIG. 5 does not include an L-SIG field in contrast to the existing PPDU. Accordingly, a data rate for data transmitted through the rate subfield and the length subfield and information on the length of the corresponding data may be included in the VHT-SIGA field and may be then transmitted. Receiving the VHT-length field, an STA may obtain information relating to TXTIME through the rate subfield and the length subfield.

A group ID field 514 indicates whether the corresponding PPDU is multi-user (MU) transmitted or single user (SU) transmitted. In the case of MU transmission, group ID field 514 includes a group ID subfield containing a group ID. The group ID field further includes a number-of-spatial streams (Nss, # of SS) subfield indicating the number of spatial streams transmitted upon MIMO transmission.

In case the group ID in the group ID subfield is set as a specific value, it may be set to indicate SU transmission. For example, in case the group ID value is 0, it may be set to indicate SU transmission. If the group ID indicates SU transmission, the Nss subfield may be set to indicate the number of spatial streams transmitted to the corresponding STA through MIMO transmission. At this time, the number of spatial streams may be set to indicate one through up to 8.

If the group ID in the group ID subfield indicates MU transmission, the Nss subfield may be set to indicate the number of spatial streams assigned to each STA included in the transmission target STA group. For example, in case four STAs are included in the transmission target STA group, four subfields may be implemented to indicate the number of spatial streams assigned to STA1, the number of spatial streams assigned to STA2, the number of spatial streams assigned to STA3, and the number of spatial streams assigned to STA4, respectively. One subfield may be set to indicate a minimum of 0 to a maximum of 4 as the number of spatial streams assigned to a specific STA.

The VHT-SIGA field may be implemented to a size of 48 bits. The BW field may be set as two bits, the short GI field as one bit, the VHT-length field as 16 bits, the group ID field as 19 bits, the CRC field as 4 bits, and the tail field as 6 bits.

In case the PPDU is SU transmitted, the group ID subfield, the Nss subfield, and the reserved bit sequence may be set as [4, 3, 12] bit length or [6, 3, 10] bit length.

In case the PPDU is MU transmitted, Nss for STA1, Nss for STA2, Nss for STA3 and Nss for STA4 subfields included in the Nss subfield, the group ID subfield, and the reserved bit sequence may be set as [4, 3, 3, 3, 3, 3] or [6, 3, 3, 3, 3, 1] bit length.

Referring to FIG. 5, the VHT-SIGB field includes an MCS subfield, an FEC (forward error correction) subfield, an STBC (space time block coding) subfield, a partial AID subfield, a CRC subfield, and a tail subfield.

MCS subfield 521 is set to indicate an MCS value for a channel between a transmitting STA or an AP and a receiving STA. FEC subfield 522 indicates an FEC encoding scheme applied to generate a data field transmitted to the receiving STA. As an example, it may be set indicate whether a BCC encoding scheme or an LDPC encoding scheme has been used. The STBC subfield may be set to indicate whether to apply an STBC. The partial AID subfield may be set as a partial AID value of a transmission target STA. The partial AID subfield is a bit sequence using part of a 11 bits long AID.

The VHT-SIGB field has a size of 26 bits and according to whether it is AID masked or not may be suggested as two formats. First, referring to the left VHT-SIGB field option 1 (op1), MCS, FEC, STBC, partial AID, CRC, and tail subfield may be set in size as [4, 1, 1, 6, 8, 6] or [4, 1, 1, 10, 4, 6]. Meanwhile, referring to the right VHT-SIGB field option 2 (op2), MCS, FEC, STBC, partial AID, CRC, and tail subfield may be set in size as [4, 1, 1, 3, 3, 8, 6] or [4, 1, 1, 3, 7, 4, 6]. In this example, when doing AID masking, 11 bits constituting the partial AID and the CRC subfield may be AID masked.

Figure 6:
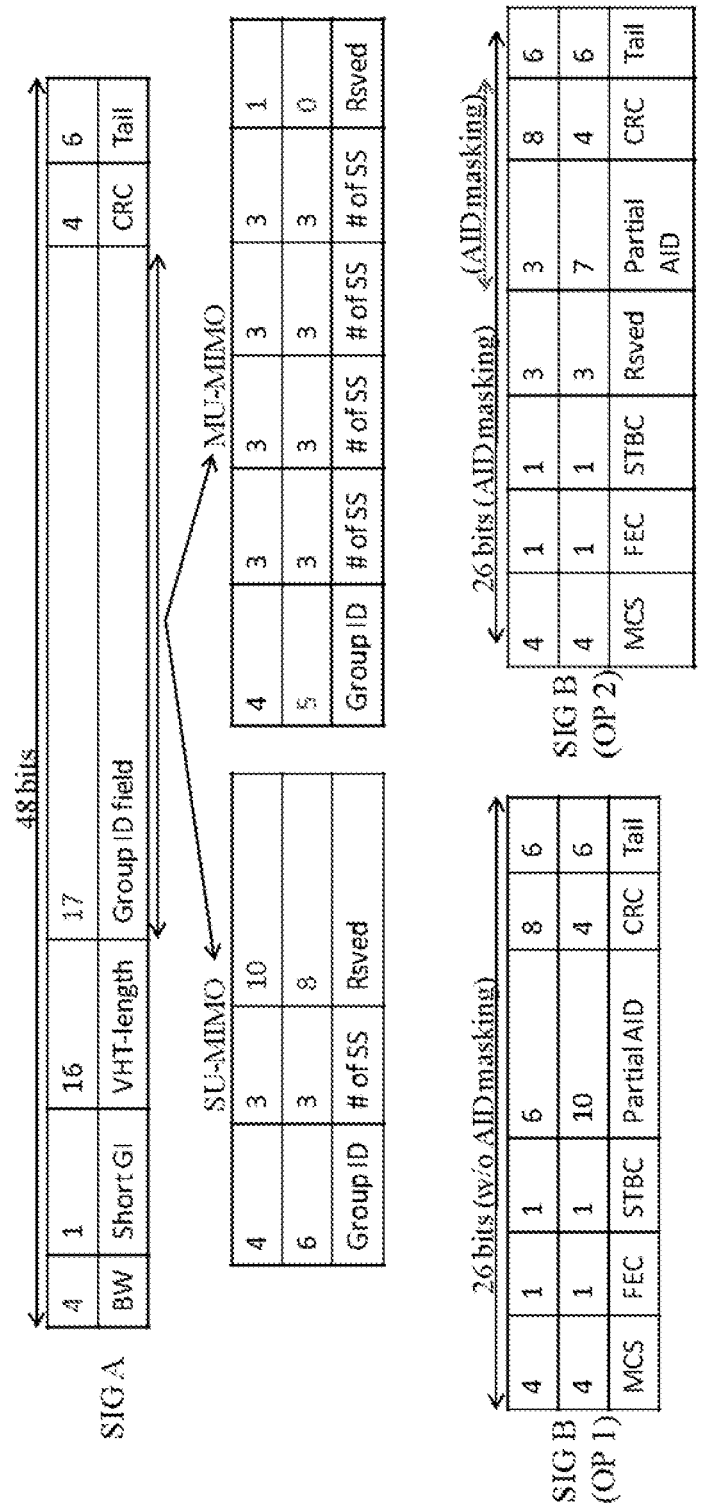

FIG. 6 is a view illustrating a second example of a signal field format according to an embodiment of the present invention.

Referring to FIG. 6, the example is directed to a format obtained by increasing the length of the BW field in the example shown in FIG. 5 from two bits to four bits. The length of the VHT-SIGA field is fixed to 48 bits, and thus, the two bits added to the BW field may be secured by reducing the length of the existing group ID field by two bits. Accordingly, the length of the group ID field turns into 17 bits. Thus, in the case of SU transmission, the group ID subfield, the Nss subfield, and the reserved bit sequence may be set in length to [4, 3, 10] bits or [6, 3, 8] bits. In contrast, in the case of MU transmission, the group ID subfield, the Nss for STA1, Nss for STA2, Nss for STA3, Nss for STA4 subfields included in the Nss subfield and the reserved bit sequence may be set in length to [4, 3, 3, 3, 3, 1] or [5, 3, 3, 3, 3, 0] bits. The VHT-SIGB field may be the same as shown in FIG. 5.

Figure 7:
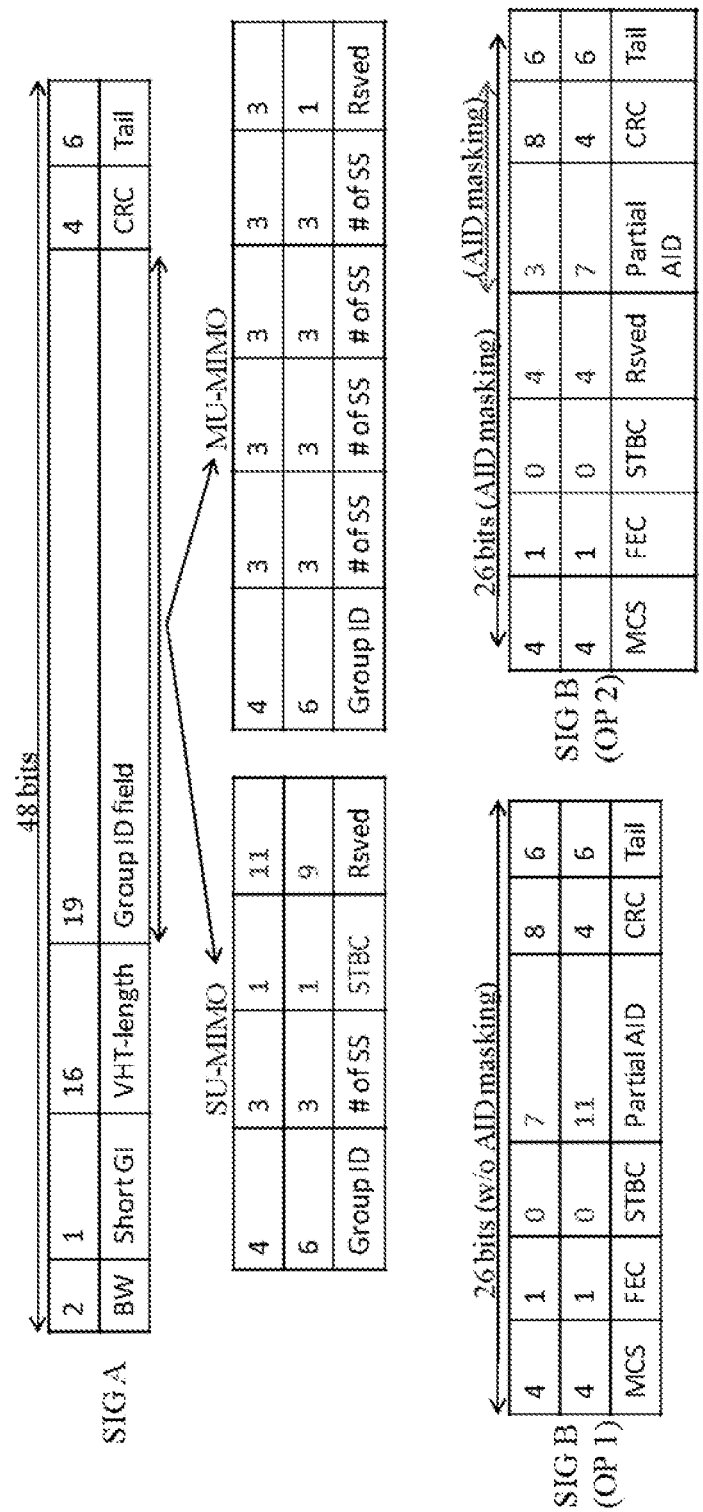

FIG. 7 is a view illustrating a third example of a signal field format according to an embodiment of the present invention.

Referring to FIG. 7, fields may be implemented so that the STBC subfield is included in the VHT-SIGA field. However, assume that upon application of this field format STBC does not apply to MU-MIMO transmission.

Upon SU transmission, the group ID subfield, the Nss subfield, the STBC subfield and reserved bit sequence included in the 19 bits long group ID field may be set to [4, 3, 1, 11] bits or [6, 3, 1, 9] bits. Upon MU transmission, the group ID field format may be set the same format as shown in FIG. 5.

In the VHT-SIGB field, as the STBC subfield is excluded, the MCS subfield, the FEC subfield, the partial AID subfield, the CRC subfield, and the tail subfield may be set in length to [4, 1, 7, 8, 6] or [4, 1, 11, 4, 6] bits (op1). Or, the MCS subfield, the FEC subfield, the reserved bit sequence, the partial AID subfield, the CRC subfield, and the tail subfield may be set in length to [4, 1, 4, 3, 8, 6] or [4, 1, 4, 7, 4, 6] (op2).

Figure 8:
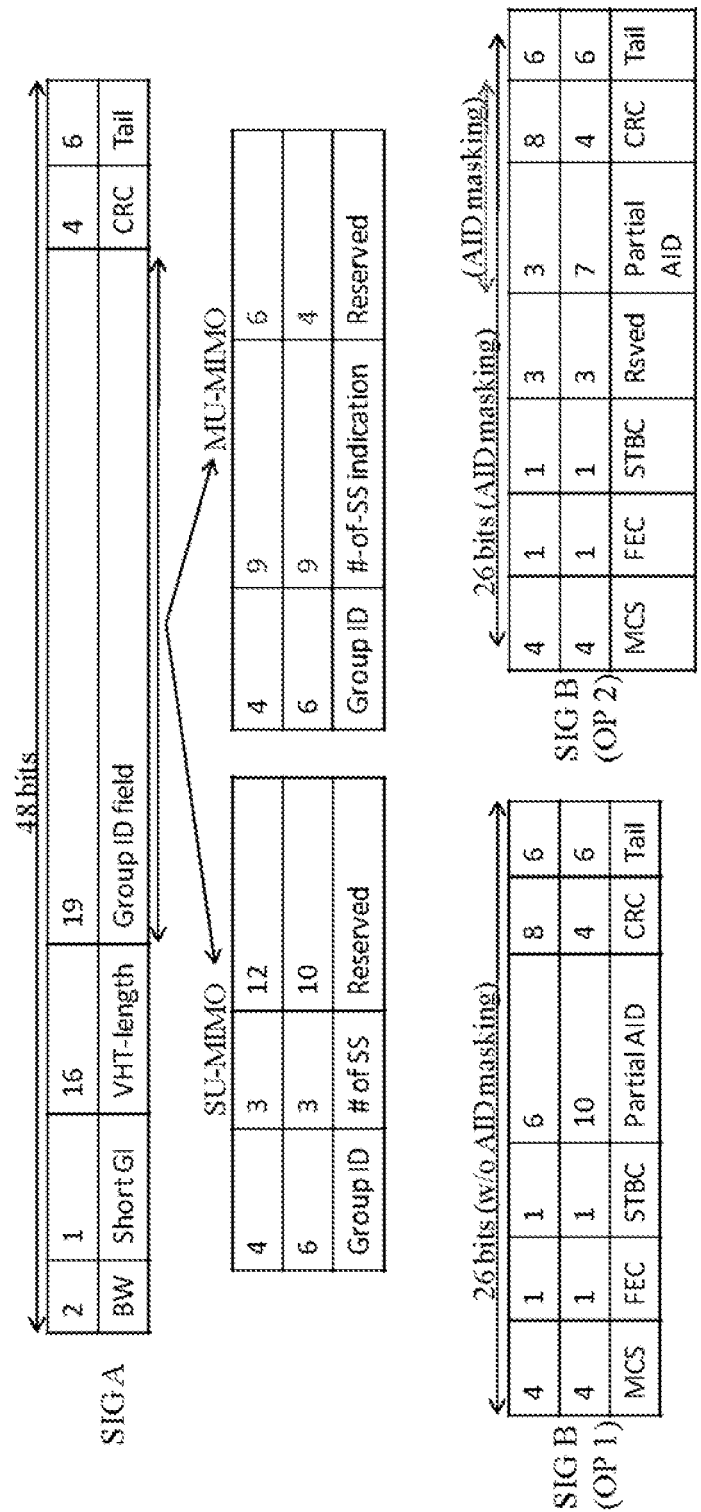

FIG. 8 is a view illustrating a fourth example of a signal field format according to an embodiment of the present invention.

Referring to FIG. 8, the format of the group ID field in the VHT-SIGA field is modified. In case the PPDU is MU transmitted, the Nss indication information included in the Nss subfield may be implemented to indicate an Nss field index. At this time, the Nss field index may be set as one of index values given in a table format. To be distinguished from the existing Nss subfield, the Nss subfield thusly implemented is referred to as Nss indication (number of spatial stream indication, #-of-SS indication, Nss indication) subfield. In such case, the length of the Nss subfield decreases from the existing 12 bits to 9 bits, and thus, the bits available in reserve increase. Refer to Table 2 below for the table-type Nss indication information relating to the Nss indication information. Meanwhile, upon SU transmission, the group ID field format and the VHT-SIGB field format may be implemented as shown in FIG. 5.

TABLE 2

| Field index | SSAID#0 | SSAID#1 | SSAID#2 | SSAID#3 |
|---|---|---|---|---|
| 0 | 0 | 0 | 1 | 1 |
| 1 | 0 | 0 | 1 | 2 |
| 2 | 0 | 0 | 1 | 3 |
| 3 | 0 | 0 | 1 | 4 |
| 4 | 0 | 0 | 2 | 1 |
| 5 | 0 | 0 | 2 | 2 |
| 6 | 0 | 0 | 2 | 3 |
| 7 | 0 | 0 | 2 | 4 |
| 8 | 0 | 0 | 3 | 1 |
| 9 | 0 | 0 | 3 | 2 |
| 10 | 0 | 0 | 3 | 3 |
| 11 | 0 | 0 | 3 | 4 |
| 12 | 0 | 0 | 4 | 1 |
| 13 | 0 | 0 | 4 | 2 |
| 14 | 0 | 0 | 4 | 3 |
| 15 | 0 | 0 | 4 | 4 |
| 16 | 0 | 1 | 0 | 1 |
| 17 | 0 | 1 | 0 | 2 |
| 18 | 0 | 1 | 0 | 3 |
| 19 | 0 | 1 | 0 | 4 |
| 20 | 0 | 1 | 1 | 0 |
| 21 | 0 | 1 | 1 | 1 |
| 22 | 0 | 1 | 1 | 2 |
| 23 | 0 | 1 | 1 | 3 |
| 24 | 0 | 1 | 1 | 4 |
| 25 | 0 | 1 | 2 | 0 |
| 26 | 0 | 1 | 2 | 1 |
| 27 | 0 | 1 | 2 | 2 |
| 28 | 0 | 1 | 2 | 3 |
| 29 | 0 | 1 | 2 | 4 |
| 30 | 0 | 1 | 3 | 0 |
| 31 | 0 | 1 | 3 | 1 |
| 32 | 0 | 1 | 3 | 2 |
| 33 | 0 | 1 | 3 | 3 |
| 34 | 0 | 1 | 3 | 4 |
| 35 | 0 | 1 | 4 | 0 |
| 36 | 0 | 1 | 4 | 1 |
| 37 | 0 | 1 | 4 | 2 |
| 38 | 0 | 1 | 4 | 3 |
| 39 | 0 | 2 | 0 | 1 |
| 40 | 0 | 2 | 0 | 2 |
| 41 | 0 | 2 | 0 | 3 |
| 42 | 0 | 2 | 0 | 4 |
| 43 | 0 | 2 | 1 | 0 |
| 44 | 0 | 2 | 1 | 1 |
| 45 | 0 | 2 | 1 | 2 |
| 46 | 0 | 2 | 1 | 3 |
| 47 | 0 | 2 | 1 | 4 |
| 48 | 0 | 2 | 2 | 0 |
| 49 | 0 | 2 | 2 | 1 |
| 50 | 0 | 2 | 2 | 2 |
| 51 | 0 | 2 | 2 | 3 |
| 52 | 0 | 2 | 2 | 4 |
| 53 | 0 | 2 | 3 | 0 |
| 54 | 0 | 2 | 3 | 1 |
| 55 | 0 | 2 | 3 | 2 |
| 56 | 0 | 2 | 3 | 3 |
| 57 | 0 | 2 | 4 | 0 |
| 58 | 0 | 2 | 4 | 1 |
| 59 | 0 | 2 | 4 | 2 |
| 60 | 0 | 3 | 0 | 1 |
| 61 | 0 | 3 | 0 | 2 |
| 62 | 0 | 3 | 0 | 3 |
| 63 | 0 | 3 | 0 | 4 |
| 64 | 0 | 3 | 1 | 0 |
| 65 | 0 | 3 | 1 | 1 |
| 66 | 0 | 3 | 1 | 2 |
| 67 | 0 | 3 | 1 | 3 |
| 68 | 0 | 3 | 1 | 4 |
| 69 | 0 | 3 | 2 | 0 |
| 70 | 0 | 3 | 2 | 1 |
| 71 | 0 | 3 | 2 | 2 |
| 72 | 0 | 3 | 2 | 3 |
| 73 | 0 | 3 | 3 | 0 |
| 74 | 0 | 3 | 3 | 1 |
| 75 | 0 | 3 | 3 | 2 |
| 76 | 0 | 3 | 4 | 0 |
| 77 | 0 | 3 | 4 | 1 |
| 78 | 0 | 4 | 0 | 1 |
| 79 | 0 | 4 | 0 | 2 |
| 80 | 0 | 4 | 0 | 3 |
| 81 | 0 | 4 | 0 | 4 |
| 82 | 0 | 4 | 1 | 0 |
| 83 | 0 | 4 | 1 | 1 |
| 84 | 0 | 4 | 1 | 2 |
| 85 | 0 | 4 | 1 | 3 |
| 86 | 0 | 4 | 2 | 0 |
| 87 | 0 | 4 | 2 | 1 |
| 88 | 0 | 4 | 2 | 2 |
| 89 | 0 | 4 | 3 | 0 |
| 90 | 0 | 4 | 3 | 1 |
| 91 | 0 | 4 | 4 | 0 |
| 92 | 1 | 0 | 0 | 1 |
| 93 | 1 | 0 | 0 | 2 |
| 94 | 1 | 0 | 0 | 3 |
| 95 | 1 | 0 | 0 | 4 |
| 96 | 1 | 0 | 1 | 0 |
| 97 | 1 | 0 | 1 | 1 |
| 98 | 1 | 0 | 1 | 2 |
| 99 | 1 | 0 | 1 | 3 |
| 100 | 1 | 0 | 1 | 4 |
| 101 | 1 | 0 | 2 | 0 |
| 102 | 1 | 0 | 2 | 1 |

TABLE 2-continued

| Field index | SSAID#0 | SSAID#1 | SSAID#2 | SSAID#3 |
|---|---|---|---|---|
| 103 | 1 | 0 | 2 | 2 |
| 104 | 1 | 0 | 2 | 3 |
| 105 | 1 | 0 | 2 | 4 |
| 106 | 1 | 0 | 3 | 0 |
| 107 | 1 | 0 | 3 | 1 |
| 108 | 1 | 0 | 3 | 2 |
| 109 | 1 | 0 | 3 | 3 |
| 110 | 1 | 0 | 3 | 4 |
| 111 | 1 | 0 | 4 | 0 |
| 112 | 1 | 0 | 4 | 1 |
| 113 | 1 | 0 | 4 | 2 |
| 114 | 1 | 0 | 4 | 3 |
| 115 | 1 | 1 | 0 | 0 |
| 116 | 1 | 1 | 0 | 1 |
| 117 | 1 | 1 | 0 | 2 |
| 118 | 1 | 1 | 0 | 3 |
| 119 | 1 | 1 | 0 | 4 |
| 120 | 1 | 1 | 1 | 0 |
| 121 | 1 | 1 | 1 | 1 |
| 122 | 1 | 1 | 1 | 2 |
| 123 | 1 | 1 | 1 | 3 |
| 124 | 1 | 1 | 1 | 4 |
| 125 | 1 | 1 | 2 | 0 |
| 126 | 1 | 1 | 2 | 1 |
| 127 | 1 | 1 | 2 | 2 |
| 128 | 1 | 1 | 2 | 3 |
| 129 | 1 | 1 | 2 | 4 |
| 130 | 1 | 1 | 3 | 0 |
| 131 | 1 | 1 | 3 | 1 |
| 132 | 1 | 1 | 3 | 2 |
| 133 | 1 | 1 | 3 | 3 |
| 134 | 1 | 1 | 4 | 0 |
| 135 | 1 | 1 | 4 | 1 |
| 136 | 1 | 1 | 4 | 2 |
| 137 | 1 | 2 | 0 | 0 |
| 138 | 1 | 2 | 0 | 1 |
| 139 | 1 | 2 | 0 | 2 |
| 140 | 1 | 2 | 0 | 3 |
| 141 | 1 | 2 | 0 | 4 |
| 142 | 1 | 2 | 1 | 0 |
| 143 | 1 | 2 | 1 | 1 |
| 144 | 1 | 2 | 1 | 2 |
| 145 | 1 | 2 | 1 | 3 |
| 146 | 1 | 2 | 1 | 4 |
| 147 | 1 | 2 | 2 | 0 |
| 148 | 1 | 2 | 2 | 1 |
| 149 | 1 | 2 | 2 | 2 |
| 150 | 1 | 2 | 2 | 3 |
| 151 | 1 | 2 | 3 | 0 |
| 152 | 1 | 2 | 3 | 1 |
| 153 | 1 | 2 | 3 | 2 |
| 154 | 1 | 2 | 4 | 0 |
| 155 | 1 | 2 | 4 | 1 |
| 156 | 1 | 3 | 0 | 0 |
| 157 | 1 | 3 | 0 | 1 |
| 158 | 1 | 3 | 0 | 2 |
| 159 | 1 | 3 | 0 | 3 |
| 160 | 1 | 3 | 0 | 4 |
| 161 | 1 | 3 | 1 | 0 |
| 162 | 1 | 3 | 1 | 1 |
| 163 | 1 | 3 | 1 | 2 |
| 164 | 1 | 3 | 1 | 3 |
| 165 | 1 | 3 | 2 | 0 |
| 166 | 1 | 3 | 2 | 1 |
| 167 | 1 | 3 | 2 | 2 |
| 168 | 1 | 3 | 3 | 0 |
| 169 | 1 | 3 | 3 | 1 |
| 170 | 1 | 3 | 4 | 0 |
| 171 | 1 | 4 | 0 | 0 |
| 172 | 1 | 4 | 0 | 1 |
| 173 | 1 | 4 | 0 | 2 |
| 174 | 1 | 4 | 0 | 3 |
| 175 | 1 | 4 | 1 | 0 |
| 176 | 1 | 4 | 1 | 1 |
| 177 | 1 | 4 | 1 | 2 |
| 178 | 1 | 4 | 2 | 0 |
| 179 | 1 | 4 | 2 | 1 |
| 180 | 1 | 4 | 3 | 0 |
| 181 | 2 | 0 | 0 | 1 |
| 182 | 2 | 0 | 0 | 2 |
| 183 | 2 | 0 | 0 | 3 |
| 184 | 2 | 0 | 0 | 4 |
| 185 | 2 | 0 | 1 | 0 |
| 186 | 2 | 0 | 1 | 1 |
| 187 | 2 | 0 | 1 | 2 |
| 188 | 2 | 0 | 1 | 3 |
| 189 | 2 | 0 | 1 | 4 |
| 190 | 2 | 0 | 2 | 0 |
| 191 | 2 | 0 | 2 | 1 |
| 192 | 2 | 0 | 2 | 2 |
| 193 | 2 | 0 | 2 | 3 |
| 194 | 2 | 0 | 2 | 4 |
| 195 | 2 | 0 | 3 | 0 |
| 196 | 2 | 0 | 3 | 1 |
| 197 | 2 | 0 | 3 | 2 |
| 198 | 2 | 0 | 3 | 3 |
| 199 | 2 | 0 | 4 | 0 |
| 200 | 2 | 0 | 4 | 1 |
| 201 | 2 | 0 | 4 | 2 |
| 202 | 2 | 1 | 0 | 0 |
| 203 | 2 | 1 | 0 | 1 |
| 204 | 2 | 1 | 0 | 2 |
| 205 | 2 | 1 | 0 | 3 |
| 206 | 2 | 1 | 0 | 4 |
| 207 | 2 | 1 | 1 | 0 |
| 208 | 2 | 1 | 1 | 1 |
| 209 | 2 | 1 | 1 | 2 |
| 210 | 2 | 1 | 1 | 3 |
| 211 | 2 | 1 | 1 | 4 |
| 212 | 2 | 1 | 2 | 0 |
| 213 | 2 | 1 | 2 | 1 |
| 214 | 2 | 1 | 2 | 2 |
| 215 | 2 | 1 | 2 | 3 |
| 216 | 2 | 1 | 3 | 0 |
| 217 | 2 | 1 | 3 | 1 |
| 218 | 2 | 1 | 3 | 2 |
| 219 | 2 | 1 | 4 | 0 |
| 220 | 2 | 1 | 4 | 1 |
| 221 | 2 | 2 | 0 | 0 |
| 222 | 2 | 2 | 0 | 1 |
| 223 | 2 | 2 | 0 | 2 |
| 224 | 2 | 2 | 0 | 3 |
| 225 | 2 | 2 | 0 | 4 |
| 226 | 2 | 2 | 1 | 0 |
| 227 | 2 | 2 | 1 | 1 |
| 228 | 2 | 2 | 1 | 2 |
| 229 | 2 | 2 | 1 | 3 |
| 230 | 2 | 2 | 2 | 0 |
| 231 | 2 | 2 | 2 | 1 |
| 232 | 2 | 2 | 2 | 2 |
| 233 | 2 | 2 | 3 | 0 |
| 234 | 2 | 2 | 3 | 1 |
| 235 | 2 | 2 | 4 | 0 |
| 236 | 2 | 3 | 0 | 0 |
| 237 | 2 | 3 | 0 | 1 |
| 238 | 2 | 3 | 0 | 2 |
| 239 | 2 | 3 | 0 | 3 |
| 240 | 2 | 3 | 1 | 0 |
| 241 | 2 | 3 | 1 | 1 |
| 242 | 2 | 3 | 1 | 2 |
| 243 | 2 | 3 | 2 | 0 |
| 244 | 2 | 3 | 2 | 1 |
| 245 | 2 | 3 | 3 | 0 |
| 246 | 2 | 4 | 0 | 0 |
| 247 | 2 | 4 | 0 | 1 |
| 248 | 2 | 4 | 0 | 2 |
| 249 | 2 | 4 | 1 | 0 |
| 250 | 2 | 4 | 1 | 1 |
| 251 | 2 | 4 | 2 | 0 |
| 252 | 3 | 0 | 0 | 1 |
| 253 | 3 | 0 | 0 | 2 |
| 254 | 3 | 0 | 0 | 3 |
| 255 | 3 | 0 | 0 | 4 |
| 256 | 3 | 0 | 1 | 0 |

TABLE 2-continued

| Field index | SSAID#0 | SSAID#1 | SSAID#2 | SSAID#3 |
|---|---|---|---|---|
| 257 | 3 | 0 | 1 | 1 |
| 258 | 3 | 0 | 1 | 2 |
| 259 | 3 | 0 | 1 | 3 |
| 260 | 3 | 0 | 1 | 4 |
| 261 | 3 | 0 | 2 | 0 |
| 262 | 3 | 0 | 2 | 1 |
| 263 | 3 | 0 | 2 | 2 |
| 264 | 3 | 0 | 2 | 3 |
| 265 | 3 | 0 | 3 | 0 |
| 266 | 3 | 0 | 3 | 1 |
| 267 | 3 | 0 | 3 | 2 |
| 268 | 3 | 0 | 4 | 0 |
| 269 | 3 | 0 | 4 | 1 |
| 270 | 3 | 1 | 0 | 0 |
| 271 | 3 | 1 | 0 | 1 |
| 272 | 3 | 1 | 0 | 2 |
| 273 | 3 | 1 | 0 | 3 |
| 274 | 3 | 1 | 0 | 4 |
| 275 | 3 | 1 | 1 | 0 |
| 276 | 3 | 1 | 1 | 1 |
| 277 | 3 | 1 | 1 | 2 |
| 278 | 3 | 1 | 1 | 3 |
| 279 | 3 | 1 | 2 | 0 |
| 280 | 3 | 1 | 2 | 1 |
| 281 | 3 | 1 | 2 | 2 |
| 282 | 3 | 1 | 3 | 0 |
| 283 | 3 | 1 | 3 | 1 |
| 284 | 3 | 1 | 4 | 0 |
| 285 | 3 | 2 | 0 | 0 |
| 286 | 3 | 2 | 0 | 1 |
| 287 | 3 | 2 | 0 | 2 |
| 288 | 3 | 2 | 0 | 3 |
| 289 | 3 | 2 | 1 | 0 |
| 290 | 3 | 2 | 1 | 1 |
| 291 | 3 | 2 | 1 | 2 |
| 292 | 3 | 2 | 2 | 0 |
| 293 | 3 | 2 | 2 | 1 |
| 294 | 3 | 2 | 3 | 0 |
| 295 | 3 | 3 | 0 | 0 |
| 296 | 3 | 3 | 0 | 1 |
| 297 | 3 | 3 | 0 | 2 |
| 298 | 3 | 3 | 1 | 0 |
| 299 | 3 | 3 | 1 | 1 |
| 300 | 3 | 3 | 2 | 0 |
| 301 | 3 | 4 | 0 | 0 |
| 302 | 3 | 4 | 0 | 1 |
| 303 | 3 | 4 | 1 | 0 |
| 304 | 4 | 0 | 0 | 1 |
| 305 | 4 | 0 | 0 | 2 |
| 306 | 4 | 0 | 0 | 3 |
| 307 | 4 | 0 | 0 | 4 |
| 308 | 4 | 0 | 1 | 0 |
| 309 | 4 | 0 | 1 | 1 |
| 310 | 4 | 0 | 1 | 2 |
| 311 | 4 | 0 | 1 | 3 |
| 312 | 4 | 0 | 2 | 0 |
| 313 | 4 | 0 | 2 | 1 |
| 314 | 4 | 0 | 2 | 2 |
| 315 | 4 | 0 | 3 | 0 |
| 316 | 4 | 0 | 3 | 1 |
| 317 | 4 | 0 | 4 | 0 |
| 318 | 4 | 1 | 0 | 0 |
| 319 | 4 | 1 | 0 | 1 |
| 320 | 4 | 1 | 0 | 2 |
| 321 | 4 | 1 | 0 | 3 |
| 322 | 4 | 1 | 1 | 0 |
| 323 | 4 | 1 | 1 | 1 |
| 324 | 4 | 1 | 1 | 2 |
| 325 | 4 | 1 | 2 | 0 |
| 326 | 4 | 1 | 2 | 1 |
| 327 | 4 | 1 | 3 | 0 |
| 328 | 4 | 2 | 0 | 0 |
| 329 | 4 | 2 | 0 | 1 |
| 330 | 4 | 2 | 0 | 2 |
| 331 | 4 | 2 | 1 | 0 |
| 332 | 4 | 2 | 1 | 1 |
| 333 | 4 | 2 | 2 | 0 |
| 334 | 4 | 3 | 0 | 0 |
| 335 | 4 | 3 | 0 | 1 |
| 336 | 4 | 3 | 1 | 0 |
| 337 | 4 | 4 | 0 | 0 |

Figure 9:
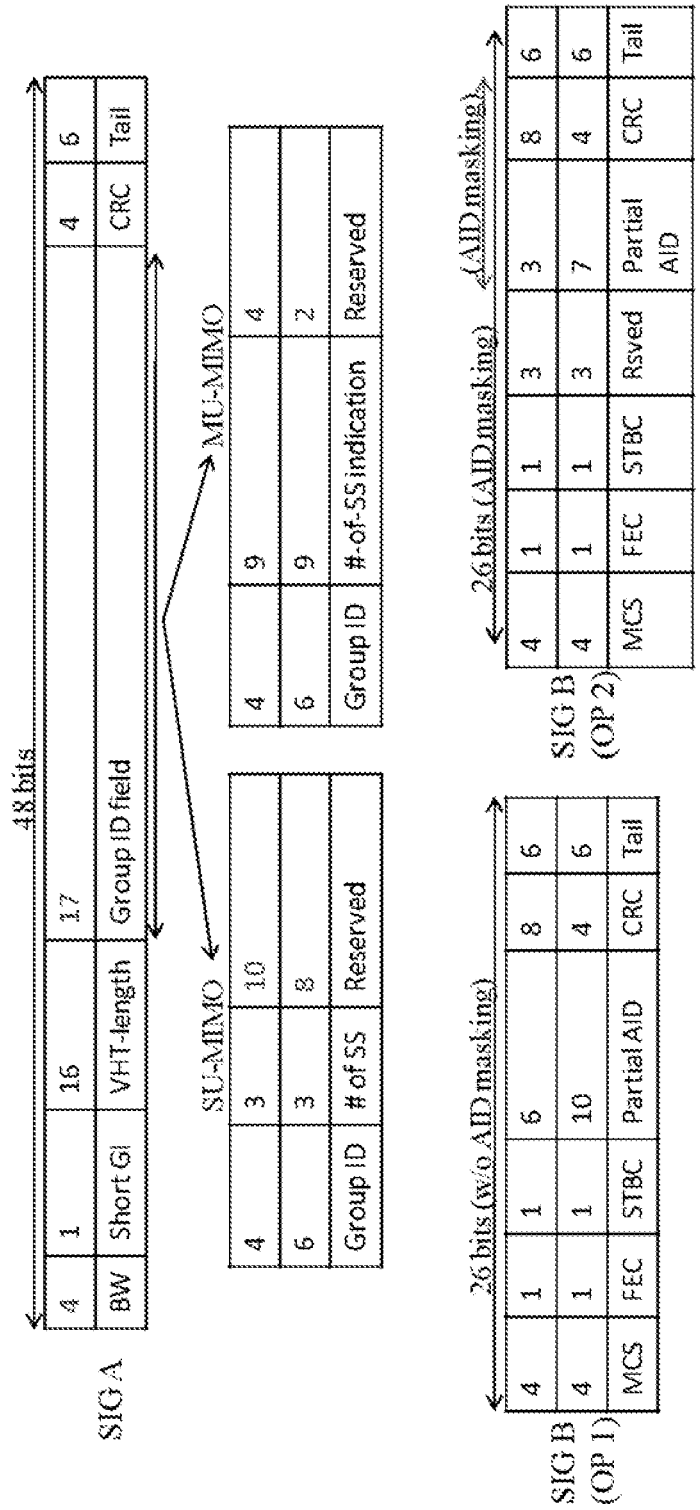

FIG. 9 is a view illustrating a fifth example of a signal field format according to an embodiment of the present invention.

Referring to FIG. 9, the signal field format corresponds to a format obtained by expanding the length of the BW field from two bits to four bits. The length of the VHT-SIGA field is fixed to 48 bits, and thus, the two bits added to the BW field may be secured by reducing the length of the group ID field by two bits. Accordingly, the length of the group ID field is reduced from 19 bits to 17 bits. In the case of SU transmission, the group ID subfield, the Nss subfield, and the reserved bit sequence may be set in length to [4, 3, 10] or [6, 3, 8] bits. On the contrary, in the case of MU transmission, the group ID subfield, the Nss indication subfield, and the reserved bit sequence may be set in length to [4, 9, 4] or [6, 9, 2] bits. The specific format of the VHT-SIGB field is shown in FIG. 5.

Figure 10:
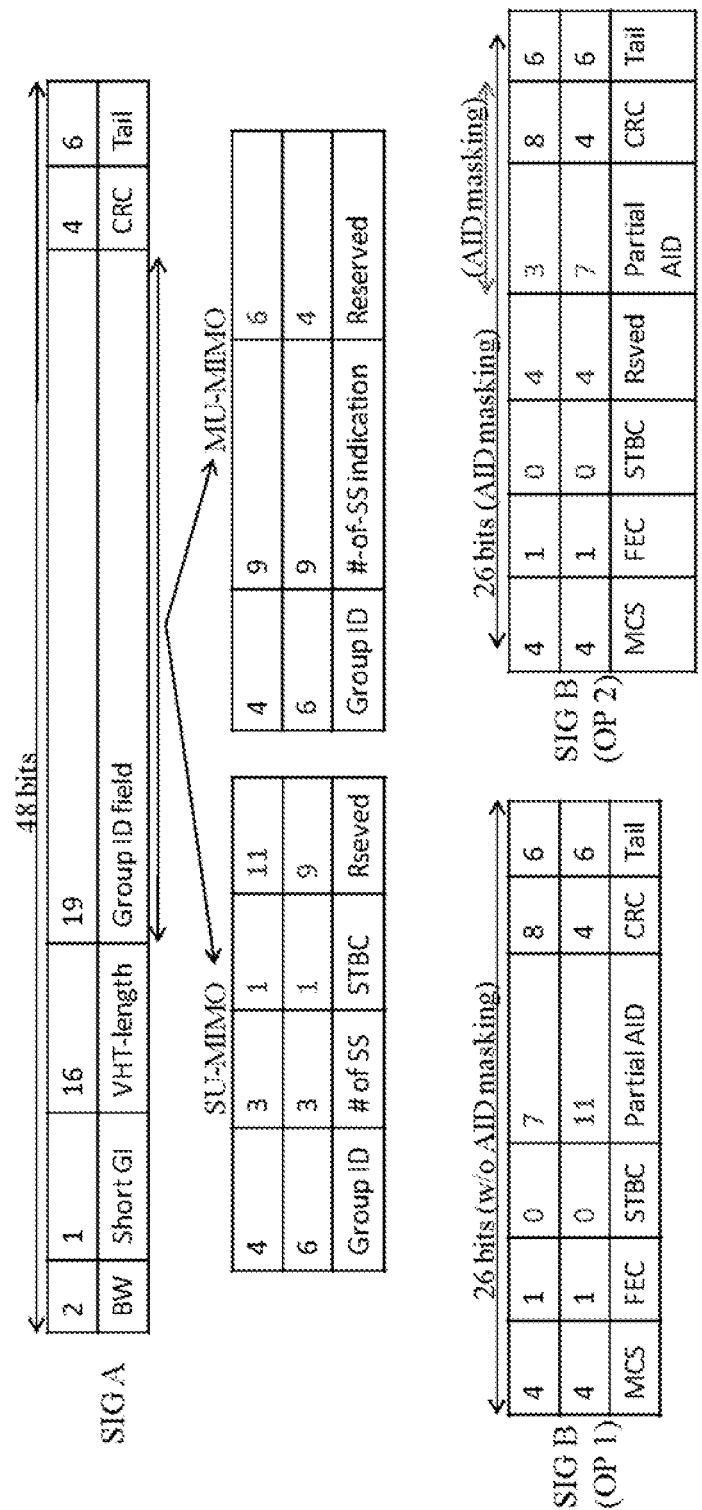

FIG. 10 is a view illustrating a sixth example of a signal field format according to an embodiment of the present invention.

Referring to FIG. 10, the signal field may be set so that the STBC subfield included in the VHT-SIGB field is included in the VHT-SIGA field. However, assume, in this example, that in case the PPDU including the signal filed is MU transmitted, the STBC does not apply. In the group ID field having a length of 19 bits, upon SU transmission, the group ID subfield, the Nss subfield, the STBC subfield, and the reserved bit sequence may be set in length to [4, 3, 1, 11] or [6, 3, 1, 9] bits. Meanwhile, in the case of MU transmission, the group ID subfield, the Nss indication subfield, and the reserved bit sequence may be set in length to [4, 9, 6] or [6, 9, 4] bits.

Since the VHT-SIGB field has the STBC subfield excluded, the MCS subfield, the FEC subfield, the partial AID subfield, the CRC subfield, and the tail subfield may be set in length to [4, 1, 7, 8, 6] bits or [4, 1, 11, 4, 6] bits (op1). Or, 4 bits in the partial AID subfield may be set as a reserved bit sequence (op2). Accordingly, the MCS subfield, the FEC subfield, the reserved bit sequence, the partial AID subfield, the CRC subfield, and the tail subfield may be set in length to [4, 1, 4, 3, 8, 6] bits or [4, 1, 4, 7, 4, 6] bits.

Figure 11:
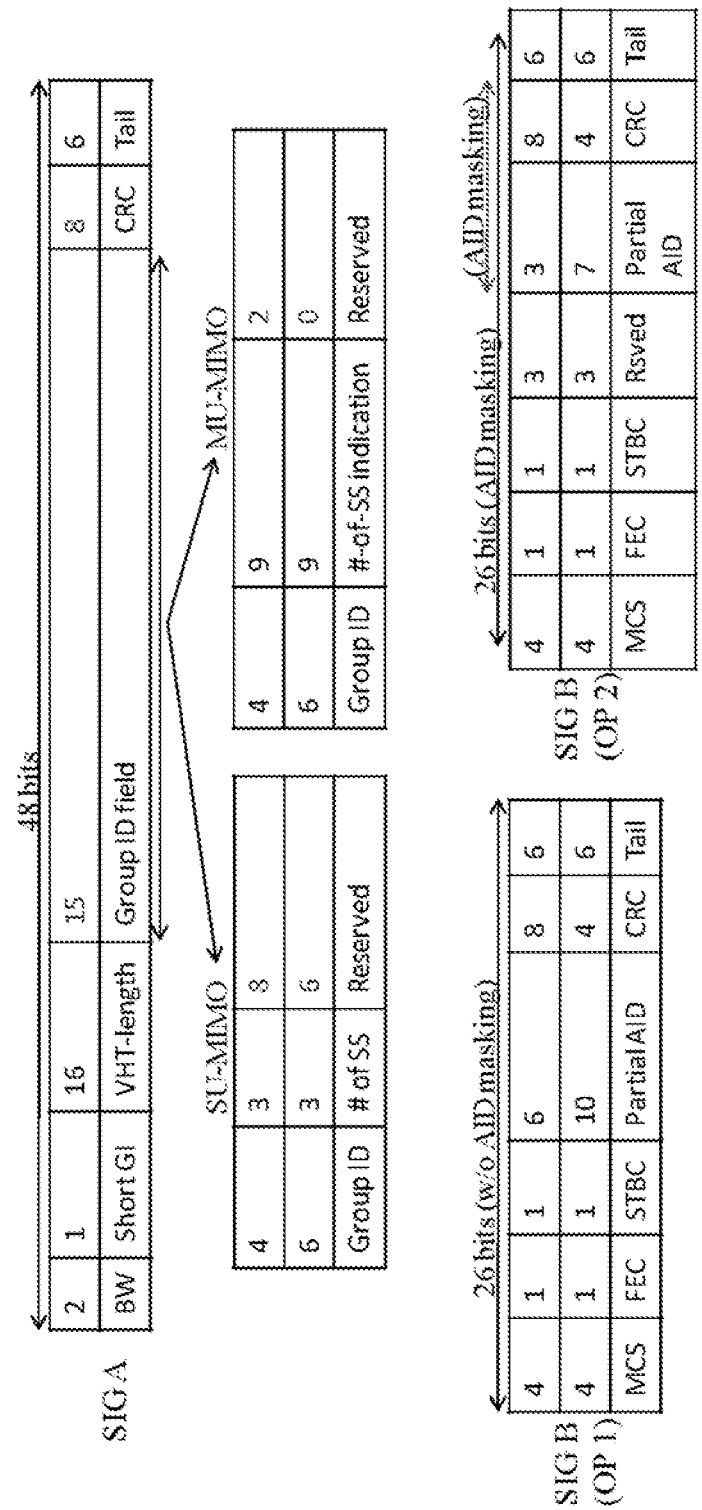

FIG. 11 is a view illustrating a seventh example of a signal field format according to an embodiment of the present invention.

Referring to FIG. 11, the signal field has a format in which the length of the CRC field in the VHT-SIGA field has been increased to 8 bits in the signal field format as shown in FIG. 8. Accordingly, the length of the group ID field in the VHT-SIGA field is set to 15 bits. In the group ID field, upon SU transmission, the group ID subfield, the Nss subfield, and the reserved bit sequence may be [4, 3, 8] bits long or [6, 3, 6] bits long. Meanwhile, upon MU transmission, the group ID subfield, the Nss indication subfield, and the reserved bit sequence may be set in length to [4, 9, 2] or [6, 9, 0] bits. The format of the VHT-SIGB field may be set to be the same as the format shown in FIG. 8.

Figure 12:
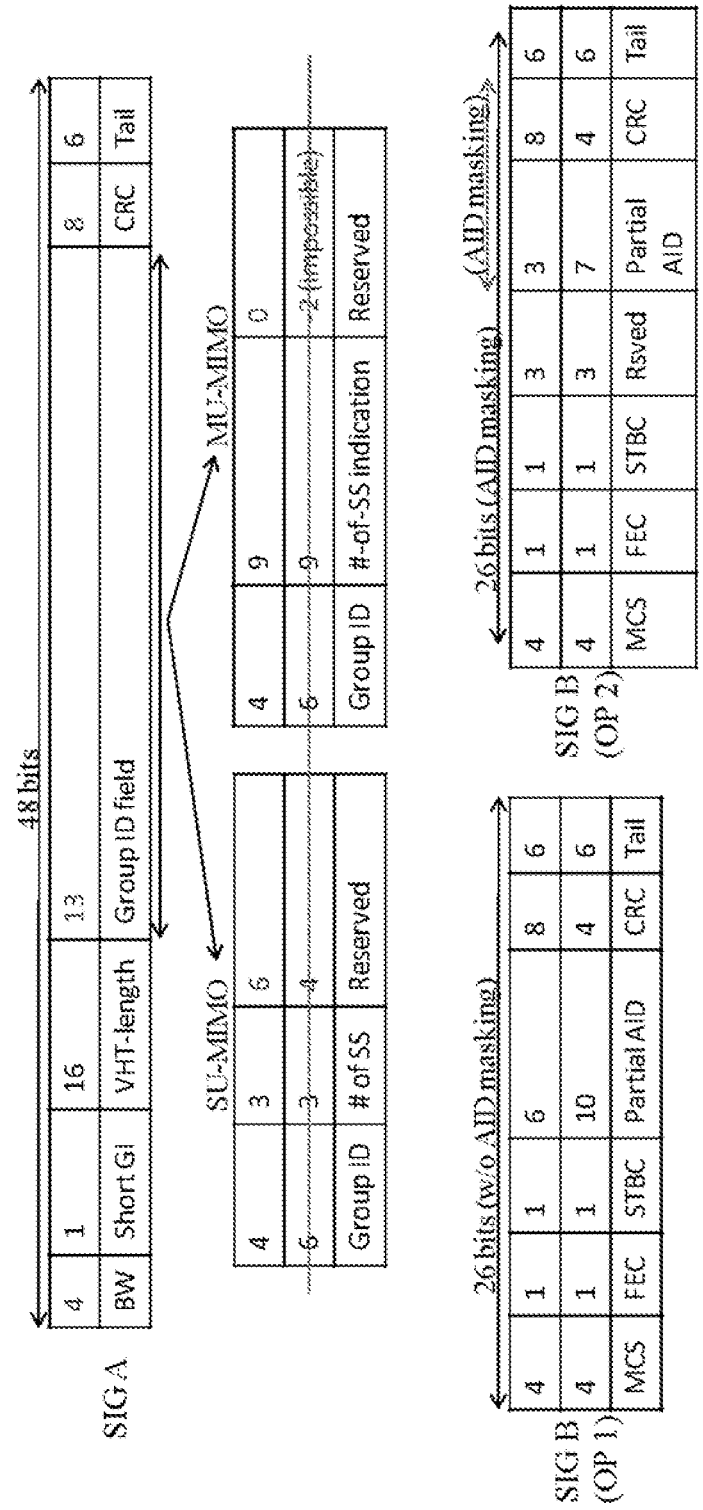

FIG. 12 is a view illustrating an eighth example of a signal field format according to an embodiment of the present invention.

Referring to FIG. 12, the length of the VHT-SIGA field is increased from two bits to four bits, and the length of the CRC field is increased to 8 bits. In this example, the increased bits in the BW field and in the CRC field may be ones assigned instead of the bits that are conventionally assigned to the group ID field. Accordingly, the length of the group ID field turns into 13 bits.

Upon SU transmission, in the group ID field, the group ID subfield, the Nss subfield, and the reserved bit sequence may be set in length to [4, 3, 6] bits. In contrast, upon MU transmission, the group ID subfield and the Nss indication subfield may be set in length to [4, 9] bits. The format of the VHT-SIGB field may be set to be the same as the format shown in FIG. 8.

Figure 13:
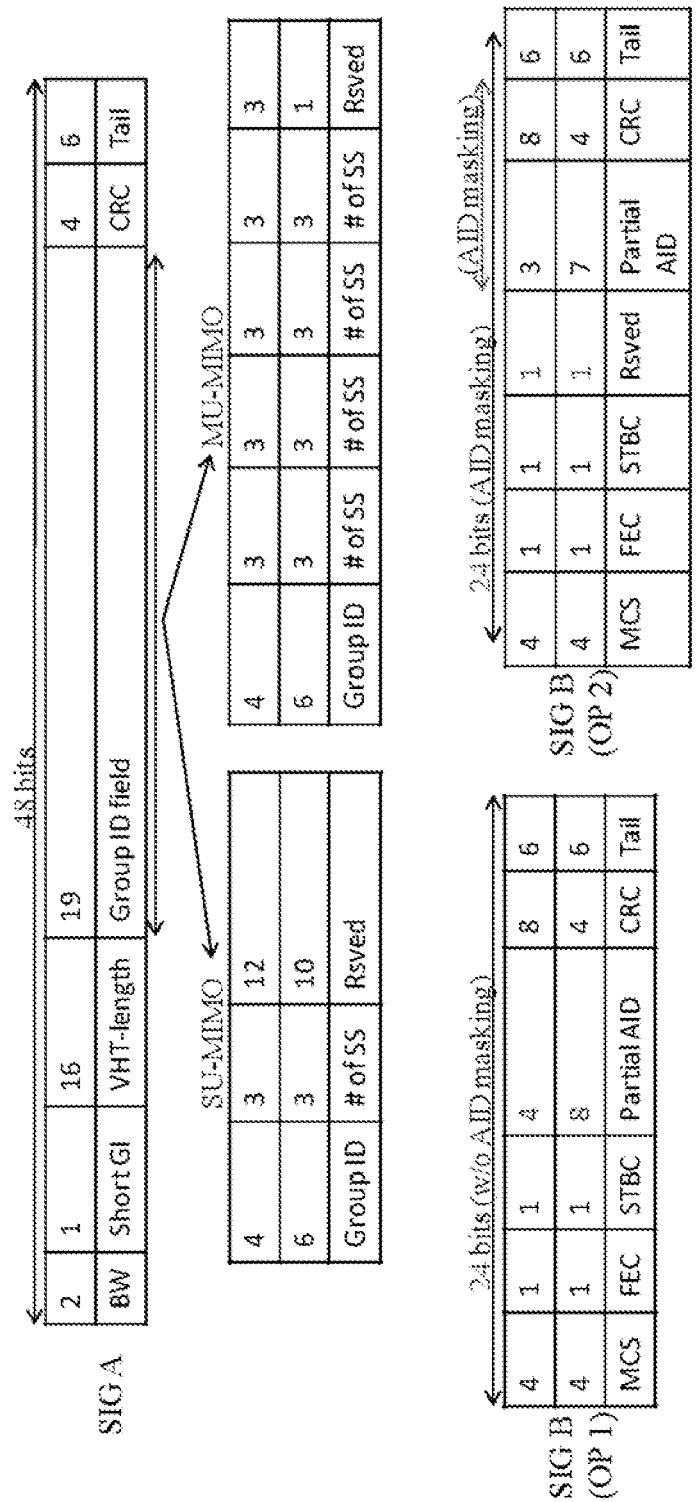

FIG. 13 is a view illustrating a ninth example of a signal field format according to an embodiment of the present invention.

Referring to FIG. 13, the format of the VHT-SIGA field is set to be the same as the format shown in FIG. 5. In contrast, the VHT-SIGB field is set to be different from the existing field format. However, unlike the existing one, the length of the VHT-SIGB field may be implemented as 24 bits.

In the VHT-SIGB field of op1 where AID masking does not apply, the MCS subfield, the FEC subfield, the STBC subfield, the partial AID subfield, the CRC subfield, and the tail subfield may be set in length to [4, 1, 1, 4, 8, 6] or [4, 1, 1, 8, 4, 6]. The AID is a 11 bits long bit sequence. Here, the partial AID means a bit sequence using part of a total of 11 bits.

Meanwhile, in the VHT-SIGB field of op2 where AID masking applies, the MCS subfield, the FEC subfield, the STBC subfield, the reserved bit sequence, the partial AID subfield, the CRC subfield, and the tail subfield may be set in length to [4, 1, 1, 1, 3, 8, 6] or [4, 1, 1, 1, 7, 4, 6]. The 11-bit bit sequence constituting the partial AID subfield and the CRC subfield may be implemented to be AID masked.

Figure 14:
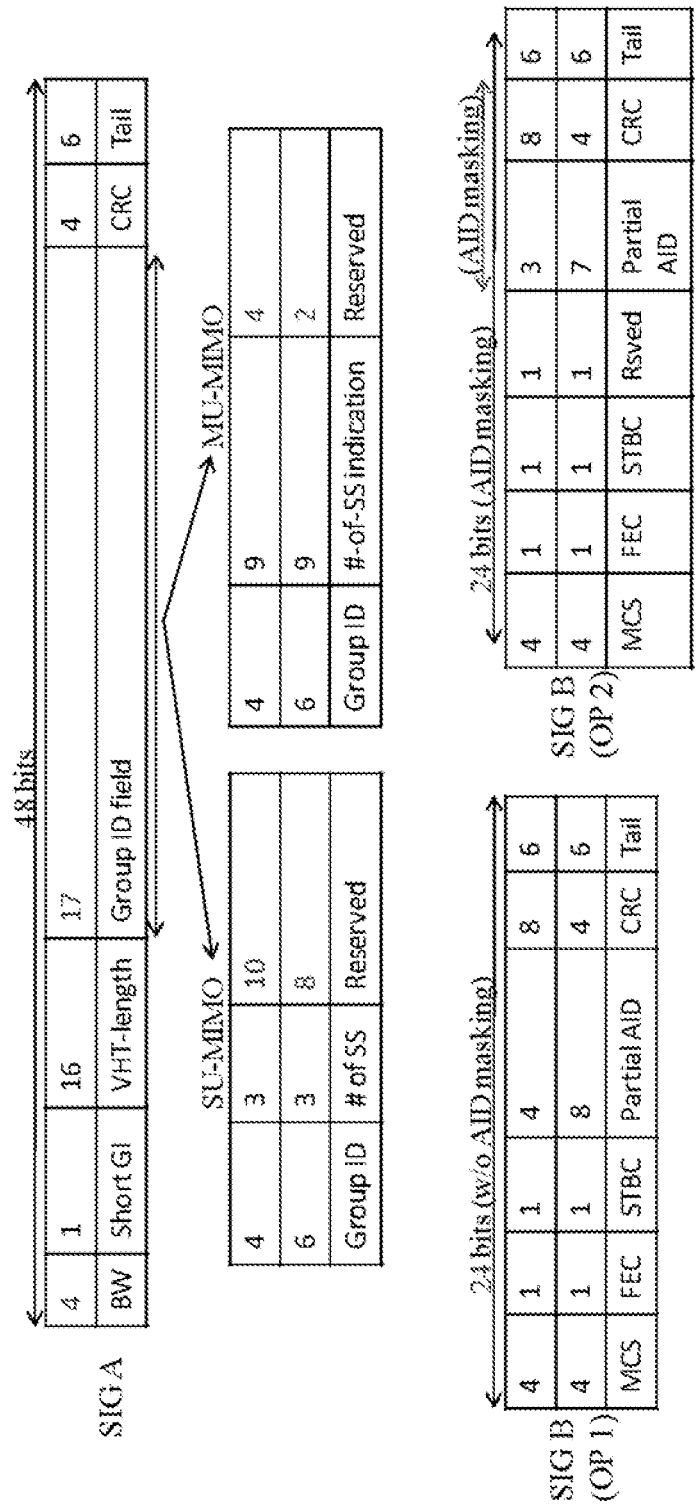

FIG. 14 is a view illustrating a tenth example of a signal field format according to an embodiment of the present invention.

Referring to FIG. 14, this signal field format corresponds to a format obtained by expanding the length of the BW field from two bits to four bits in the signal field format shown in FIG. 13. Since the length of the VHT-SIGA field is fixed to 48 bits, the two bits added to the BW field may be secured by reducing the length of the group ID field by two bits. Accordingly, the length of the group ID field is reduced from 19 bits to 17 bits. In the case of SU transmission, the group ID subfield, the Nss subfield, and the reserved bit sequence may be set in length to [4, 3, 10] or [6, 3, 8] bits. In contrast, in the case of MU transmission, the group ID subfield, the Nss indication subfield, and the reserved bit sequence may be set in length to [4, 9, 4] or [6, 9, 2] bits. A specific format of the VHT-SIGB field is the same as the format shown in FIG. 13.

Figure 15:
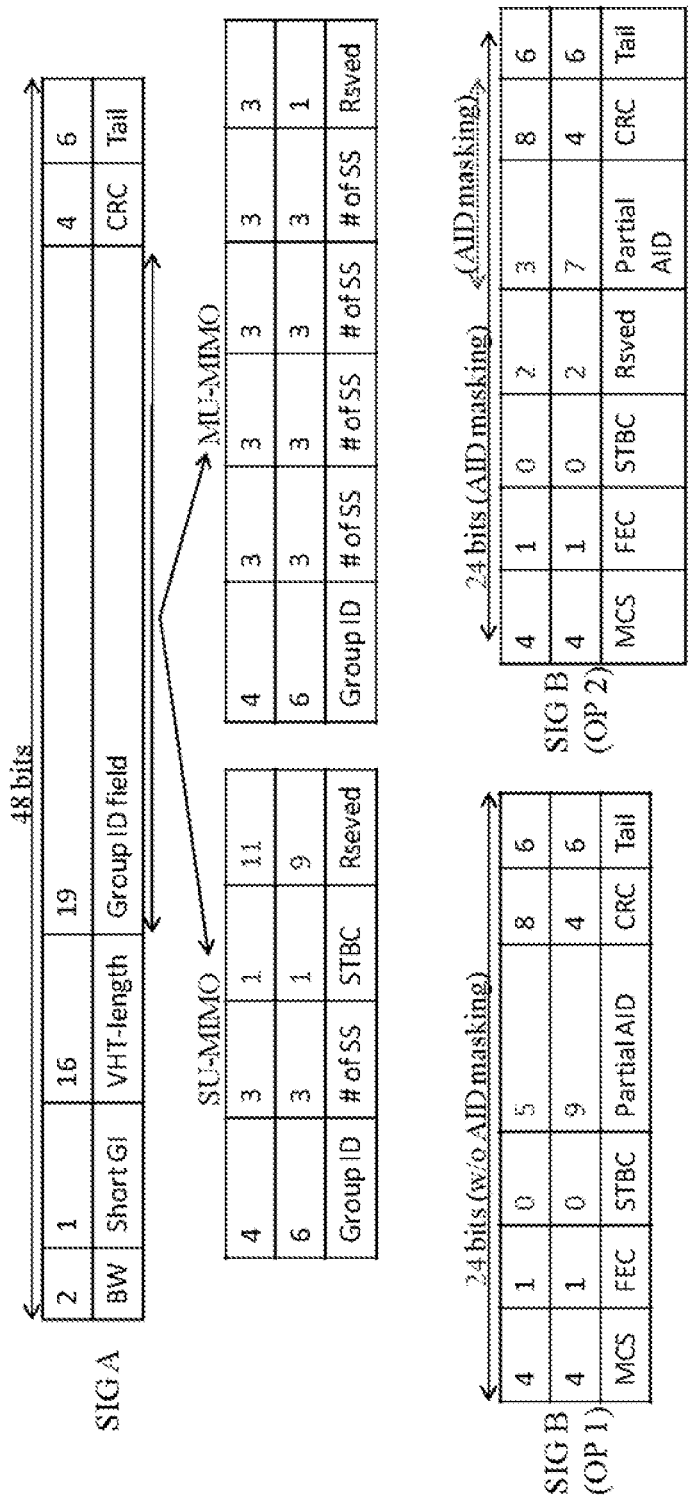

FIG. 15 is a view illustrating an eleventh example of a signal field format according to an embodiment of the present invention.

Referring to FIG. 15, the signal field may be set so that the STBC subfield included in the VHT-SIGB field may be included in the VHT-SIGA field. However, assume, in this example, that in case the PPDU including the signal field is MU transmitted, the STBC does not apply. In the group ID field having a length of 19 bits, upon SU transmission, the group ID subfield, the Nss subfield, the STBC subfield, and the reserved bit sequence may be set in length to [4, 3, 1, 11] or [6, 3, 1, 9] bits. Meanwhile, upon MU transmission, the group ID subfield, the Nss for STA1, Nss for STA2, Nss for STA3, and Nss for STA4 subfields constituting the Nss subfield, and the reserved bit sequence may be set in length to [4, 3, 3, 3, 3, 3] or [6, 3, 3, 3, 3, 1] bits.

Since the VHT-SIGB field has the STBC subfield excluded, the MCS subfield, the FEC subfield, the partial AID subfield, the CRC subfield, and the tail subfield may be set in length to [4, 1, 5, 8, 6] or [4, 1, 9, 4, 6] bits (op1). Or, two bits in the partial AID subfield may be set as a reserved bit sequence (op2). That is, in op2 where AID masking applies, the MCS subfield, the FEC subfield, the reserved bit sequence, the partial AID subfield, the CRC subfield, and the tail subfield may be set in length to [4, 1, 2, 3, 8, 6] or [4, 1, 2, 7, 4, 6] bits.

Figure 16:
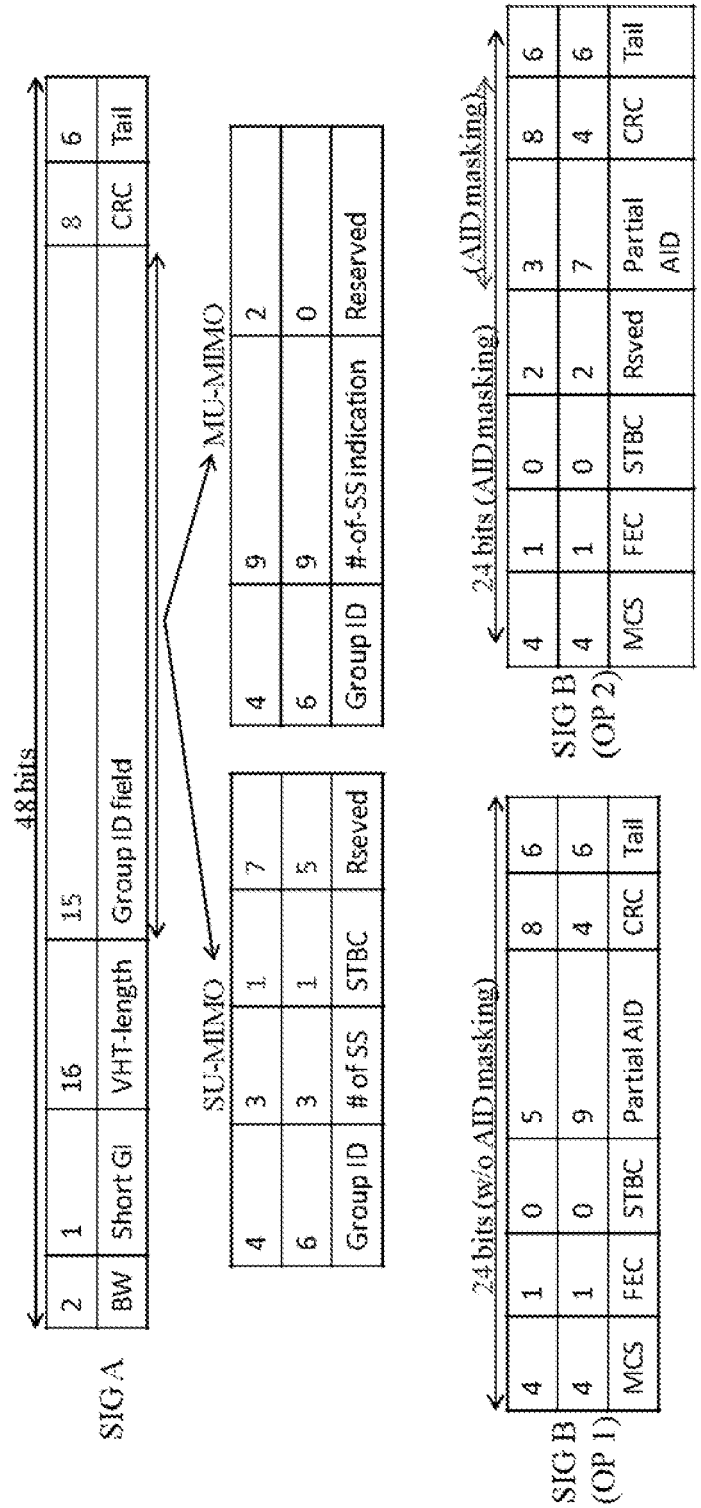

FIG. 16 is a view illustrating a twelfth example of a signal field format according to an embodiment of the present invention.

Referring to FIG. 16, the length of the CRC field in the VHT-SIGA field is increased to 8 bits. Accordingly, the length of the VHT-SIGA field is reduced from 19 bits to 15 bits. In the group ID field, upon SU transmission, the group ID subfield, the Nss subfield, the STBC subfield, and the reserved bit sequence may be set in length to [4, 3, 1, 7] or [6, 3, 1, 5] bits. Meanwhile, upon MU transmission, the group ID subfield, the Nss indication subfield, and the reserved bit sequence may be set in length to [4, 9, 2] or [6, 9, 0] bits. The VHT-SIGB field may be set to be the same as shown in FIG. 15.

Figure 17:
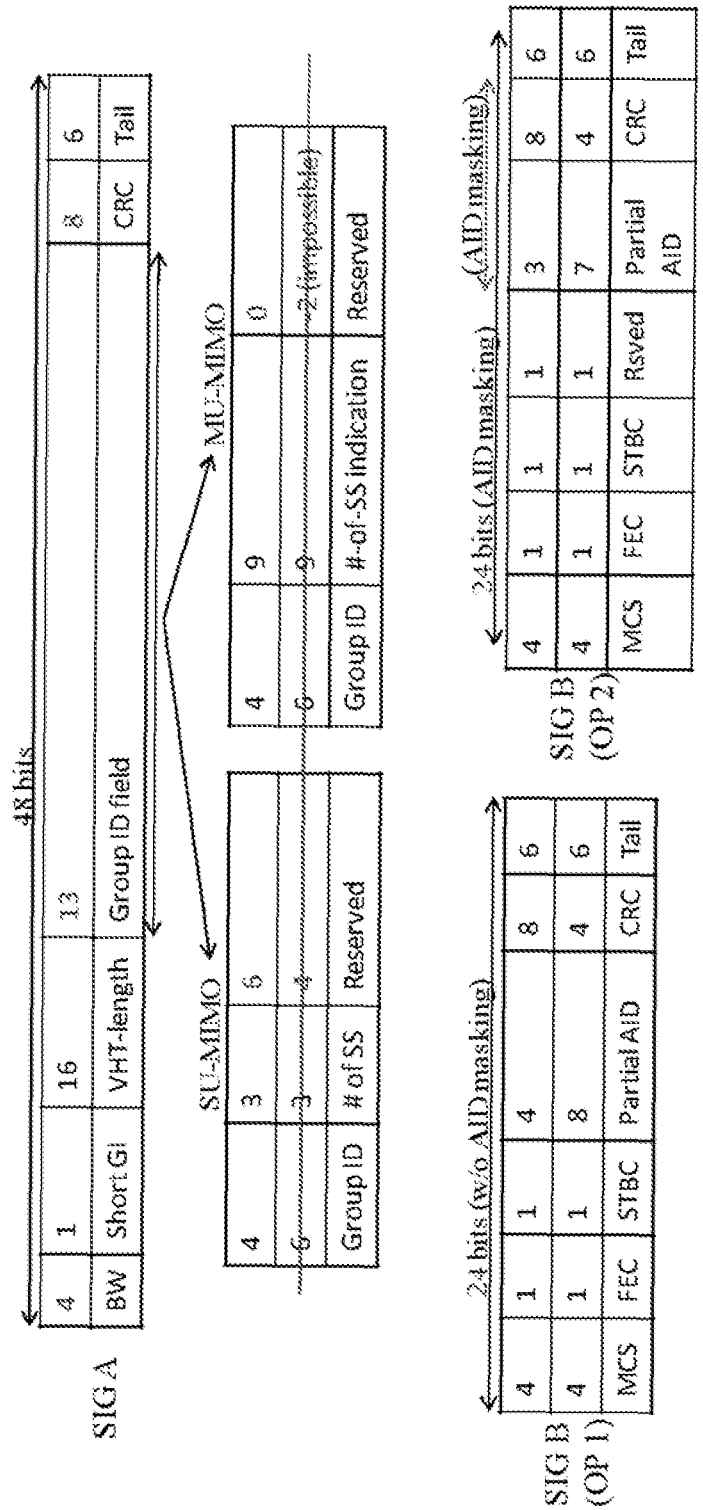

FIG. 17 is a view illustrating a thirteenth example of a signal field format according to an embodiment of the present invention.

Referring to FIG. 17, in the format shown in FIG. 13, the length of the BW field is increased from two bits to four bits, and the length of the CRC field in the VHT-SIGA field is increased to 8 bits. The increased bits in the BW field and the CRC field may be implemented by instead assigning bits that conventionally constitute the group ID field. Accordingly, the length of the group ID field is set as 13 bits.

In the group ID field, upon SU transmission, the group ID subfield, the Nss subfield, and the reserved bit sequence may be set in length to [4, 3, 6] bits. Meanwhile, upon MU transmission, the group ID subfield and the Nss indication subfield may be set in length to [4, 9] bits. The VHT-SIGB field may be set to be the same as shown in FIG. 14.

Figure 18:
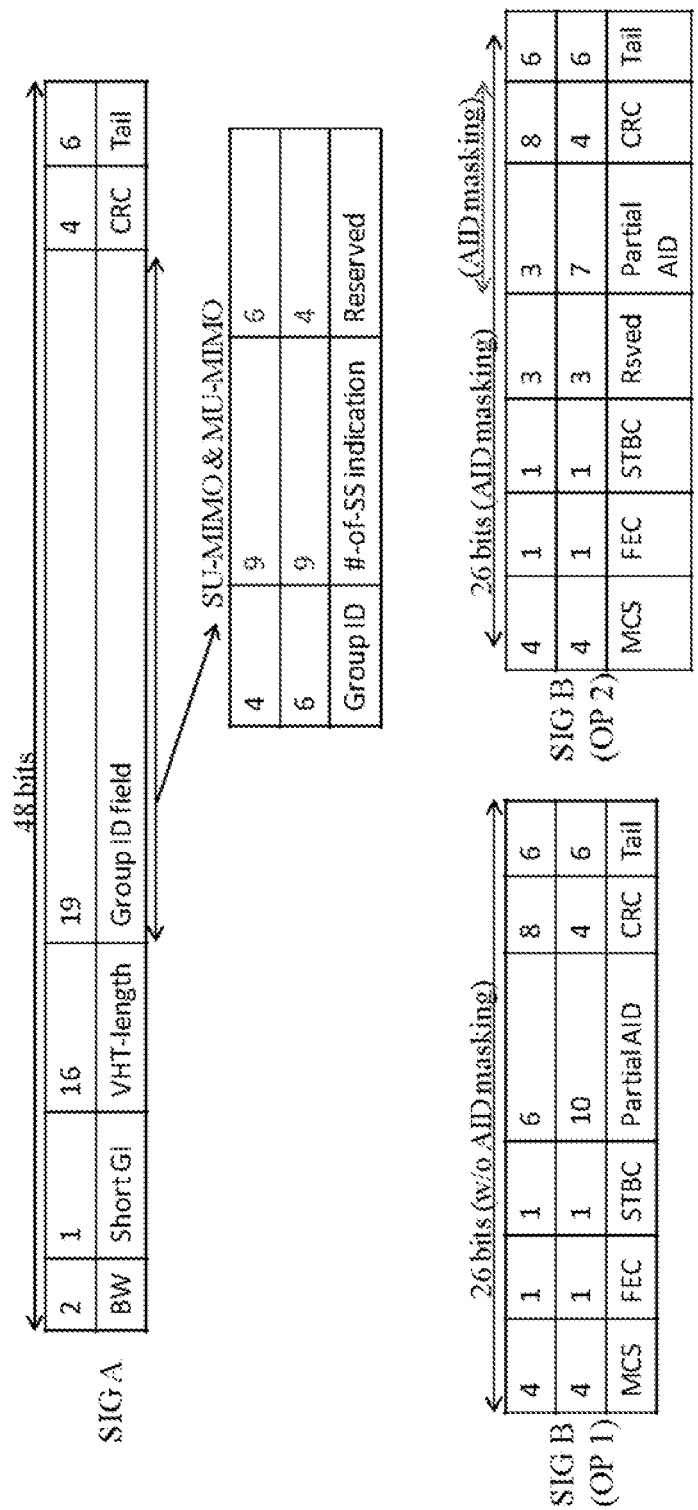

FIG. 18 is a view illustrating a fourteenth example of a signal field format according to an embodiment of the present invention.

Referring to FIG. 18, in the signal field shown in FIG. 8, upon SU transmission and upon MU transmission, the group ID field format is set to be the same. In the group ID field, the group ID subfield, the Nss indication subfield, and the reserved bit sequence may be set in length to [4, 9, 6] or [6, 9, 4] bits. Other fields constituting the VHT-SIGA field and the VHT-SIGB field have the same format as the format shown in FIG. 8.

Figure 19:
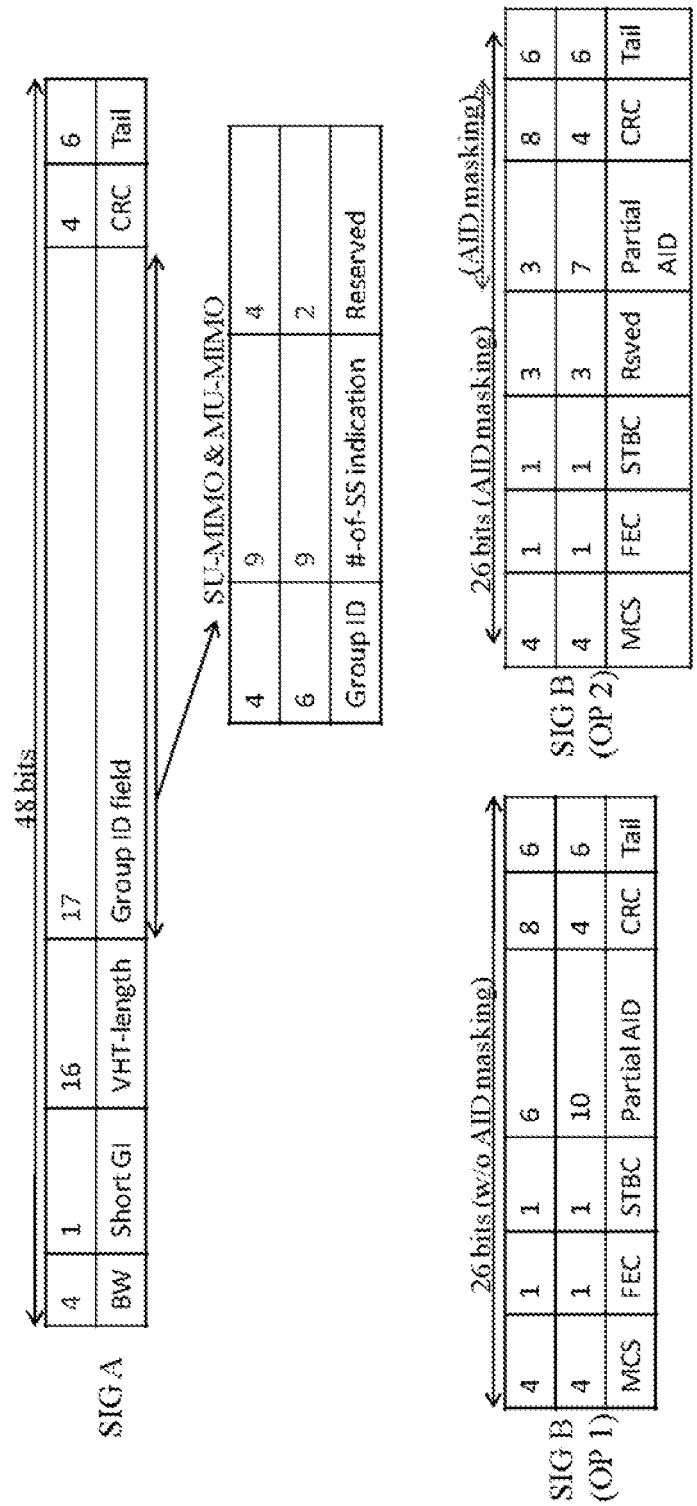

FIG. 19 is a view illustrating a fifteenth example of a signal field format according to an embodiment of the present invention.

Referring to FIG. 19, in the signal field shown in FIG. 18, the length of the BW field is increased from two bits to four bits. Since the length of the VHT-SIGA field is fixed to 48 bits, two bits included in the existing group ID field may be assigned as the increased two bits in the BW field. Accordingly, the length of the group ID field is reduced to 17 bits. In the group ID field, the group ID subfield, the Nss indication subfield, and the reserved bit sequence may be set in length to [4, 9, 4] or [6, 9, 2] bits. Other fields constituting the VHT-SIGA field and the VHT-SIGB field have the same format as the format shown in FIG. 18.

Figure 20:
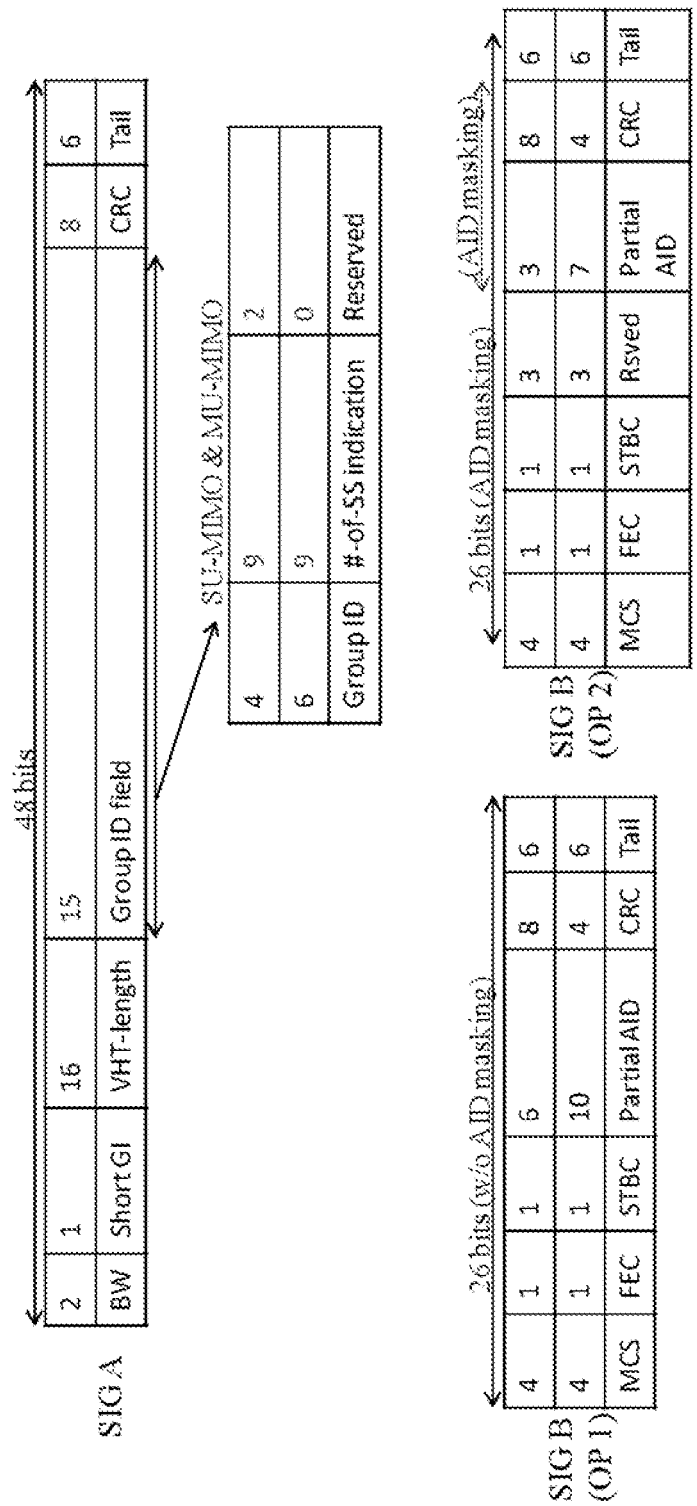

FIG. 20 is a view illustrating a sixteenth example of a signal field format according to an embodiment of the present invention.

Referring to FIG. 20, in the signal field shown in FIG. 18, the length of the CRC field in the VHT-SIGA field is increased to 8 bits. Accordingly, the length of the group ID field is reduced to 15 bits. In the group ID field, the group ID subfield, the Nss indication subfield, and the reserved bit sequence may be set in length to [4, 9, 2] or [6, 9, 0] bits. Other fields constituting the VHT-SIGA field and the VHT-SIGB field have the same format as the format shown in FIG. 18.

Figure 21:
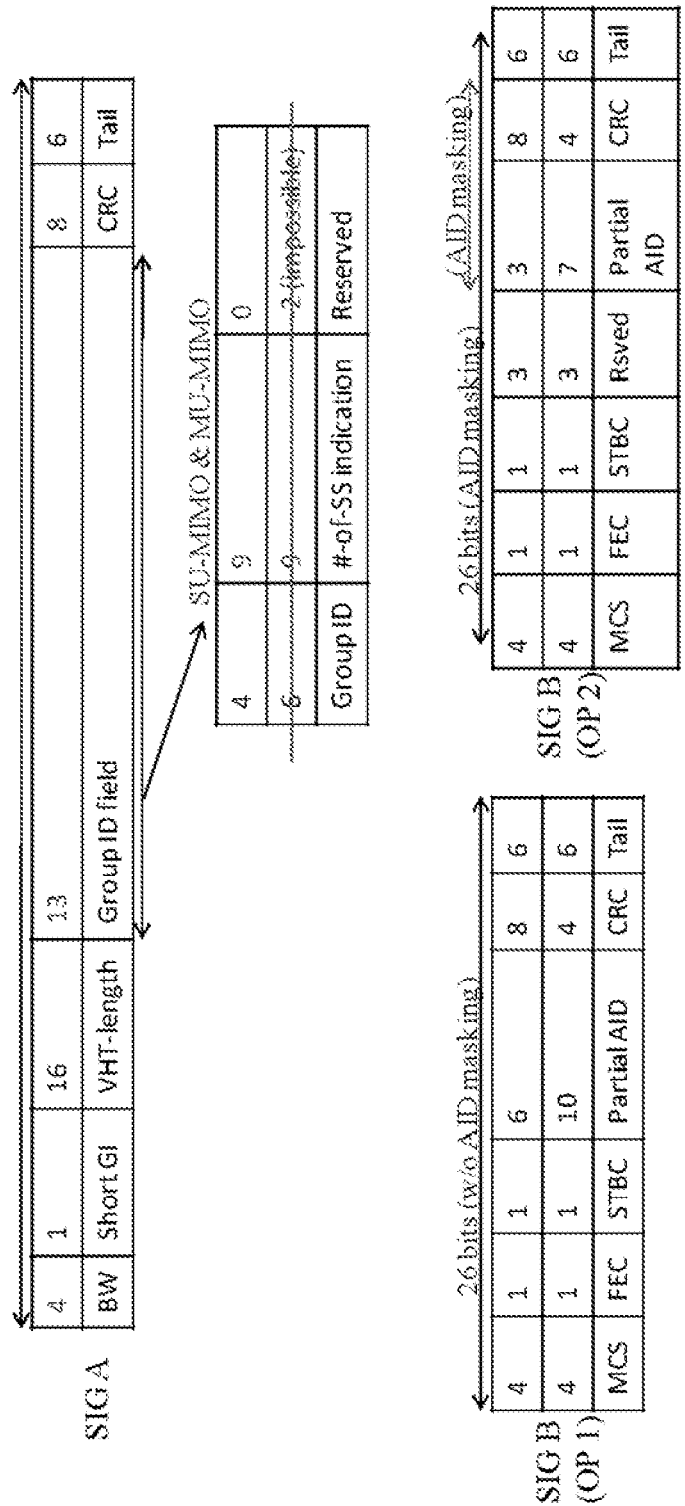

FIG. 21 is a view illustrating a seventeenth example of a signal field format according to an embodiment of the present invention.

Referring to FIG. 21, in the signal field shown in FIG. 18, the length of the BW field in the VHT-SIGA field is increased to four bits, and the length of the CRC field is increased to 8 bits. The increased bits in the BW field and the CRC field may be set to use existing bits constituting the group ID field. Accordingly, the length of the group ID field is 13 bits. In the group ID field, the group ID subfield, the Nss indication subfield, and the reserved bit sequence may be set in length to [4, 9, 0] bits. Other fields in the VHT-SIGA field and the VHT-SIGB field have the same format as the format shown in FIG. 18.

In the signal field shown in FIGS. 5 to 21, the VHT-SIGB field may be set to further include a VHT-length 2 field independent from the VHT-length field of the VHT-SIGA field. In such case, the VHT-length 2 field may be set to indicate the length for the data field 470 constituting the PPDU 400, the PSDU included in the data field 470, and/or valid data constituting the PSDU. The length may be represented as the number of OFDM symbols, time unit (e.g., μs), payload size, octet unit, or bit unit, etc.

In FIGS. 5 to 21, the format of a specific VHT-SIGA field and the format of a specific VHT-SIGB field may be organically combined with each other and are thus set to include control information intended to be transmitted to a receiving STA. However, the above-described individual VHT-SIGA field and the VHT-SIGB field format may also be implemented to be independently included in the PPDU. Accordingly, among the signal field formats suggested above, the VHT-SIGA field and the VHT-SIGB field included in the examples different from each other may be mixed with each other, thus suggesting a new signal field format.

Figure 22:
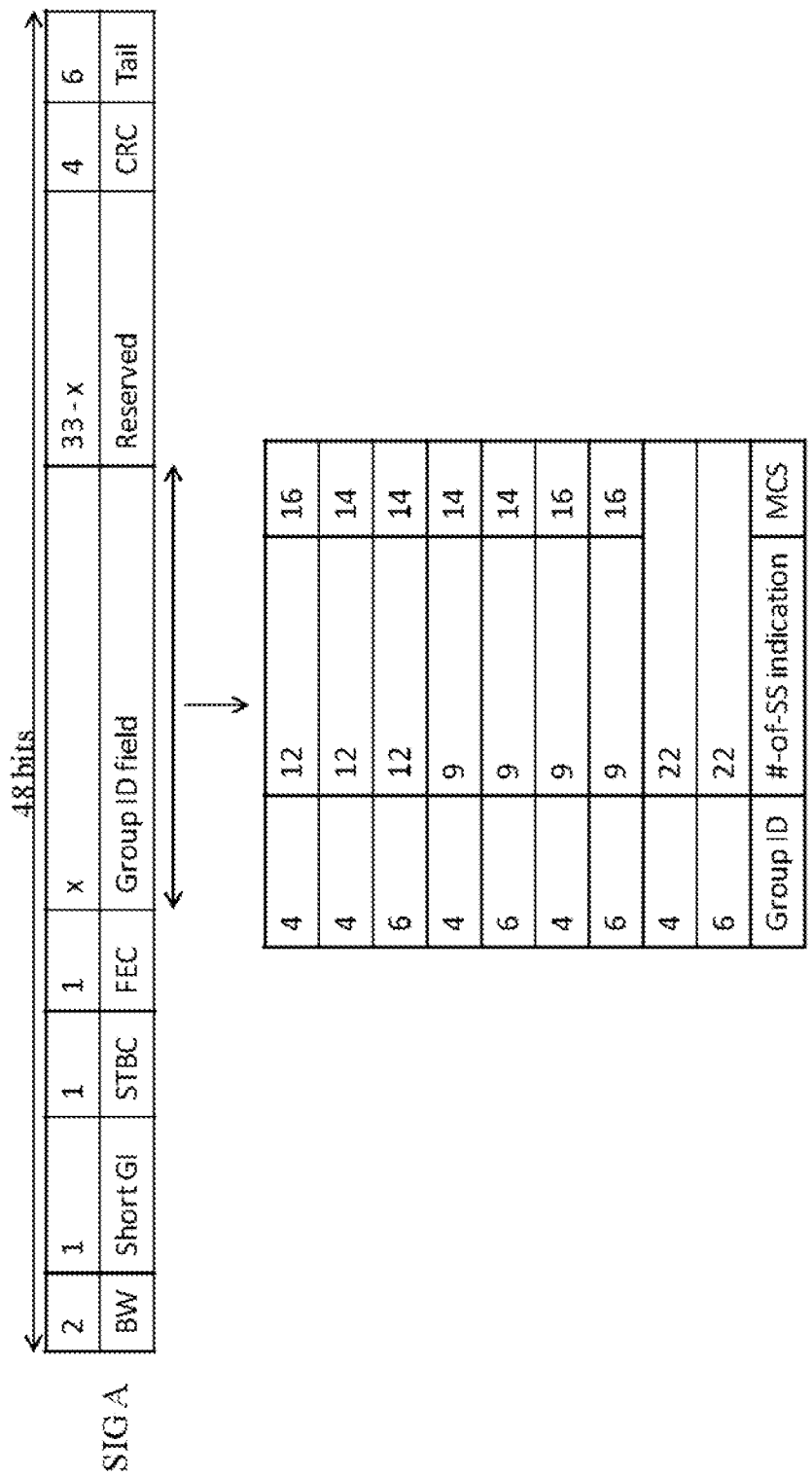

FIG. 22 is a view illustrating an eighteenth example of a signal field format according to an embodiment of the present invention.

Referring to FIG. 22, the signal field in this example is a format obtained by deleting the VHT-length field from the signal field shown in FIG. 5, removing the VHT-SIGB field, and incorporating it into the VHT-SIGA field. The VHT-SIGA field includes a BW field, a short GI field, an STBC field, an FEC field, a group ID field, a CRC field, and a tail field. The length of the VHT-SIGA field may be fixed to 48 bits.

The BW field, the short GI field, the STBC field, the FEC field, the group ID field, the reserved bit sequence, the CRC field, and the tail field may be set in length to [2, 1, 1, x, 33-x, 4, 6] bits. The group ID field assigned with x bits includes a group ID subfield, an Nss indication subfield, and an MCS subfield. Refer to the drawings for the specific format of each subfield constituting the group ID field.

Figure 23:
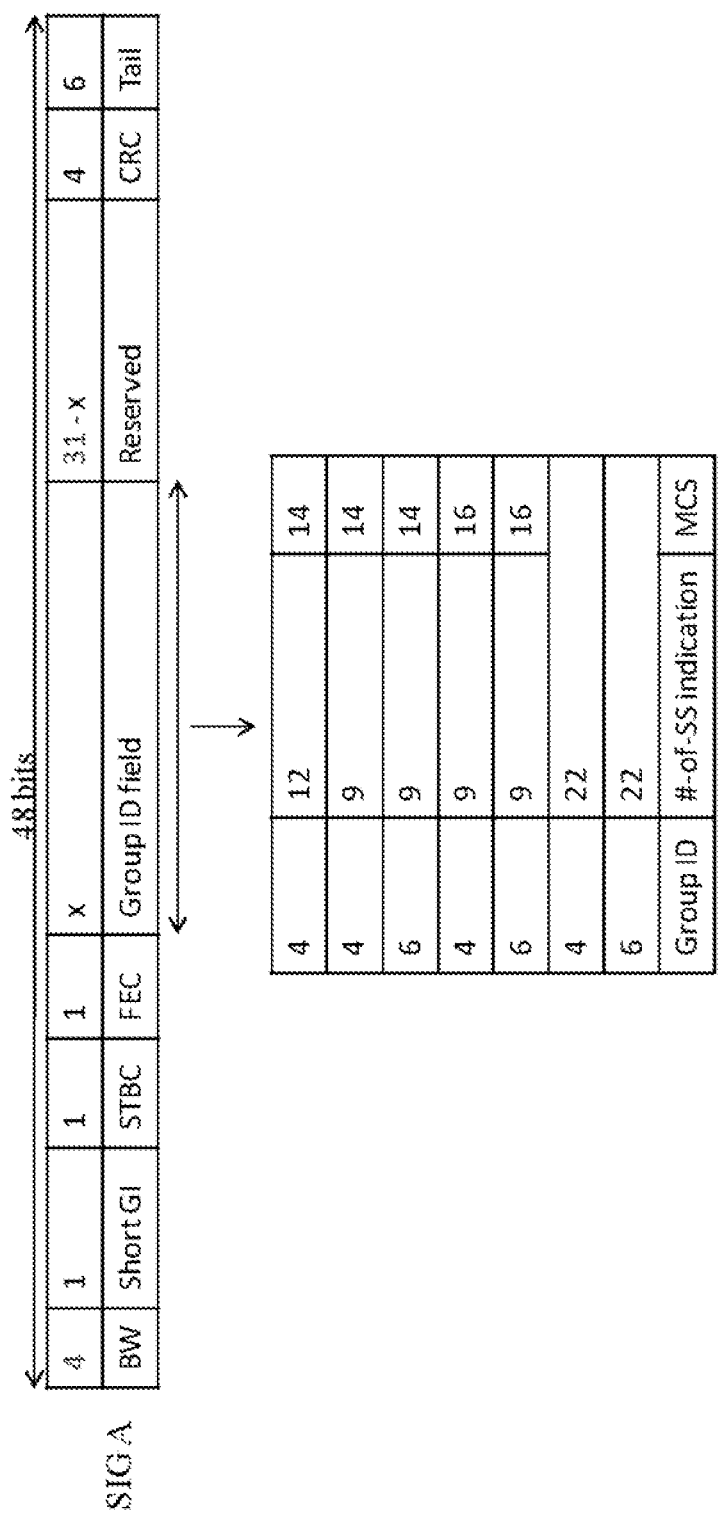

FIG. 23 is a view illustrating a nineteenth example of a signal field format according to an embodiment of the present invention.

Referring to FIG. 23, the signal field in this example has a format in which the length of the BW subfield has been increased by two bits. Accordingly, the length of the reserved bit sequence may be determined as 31-x bits.

Figure 24:
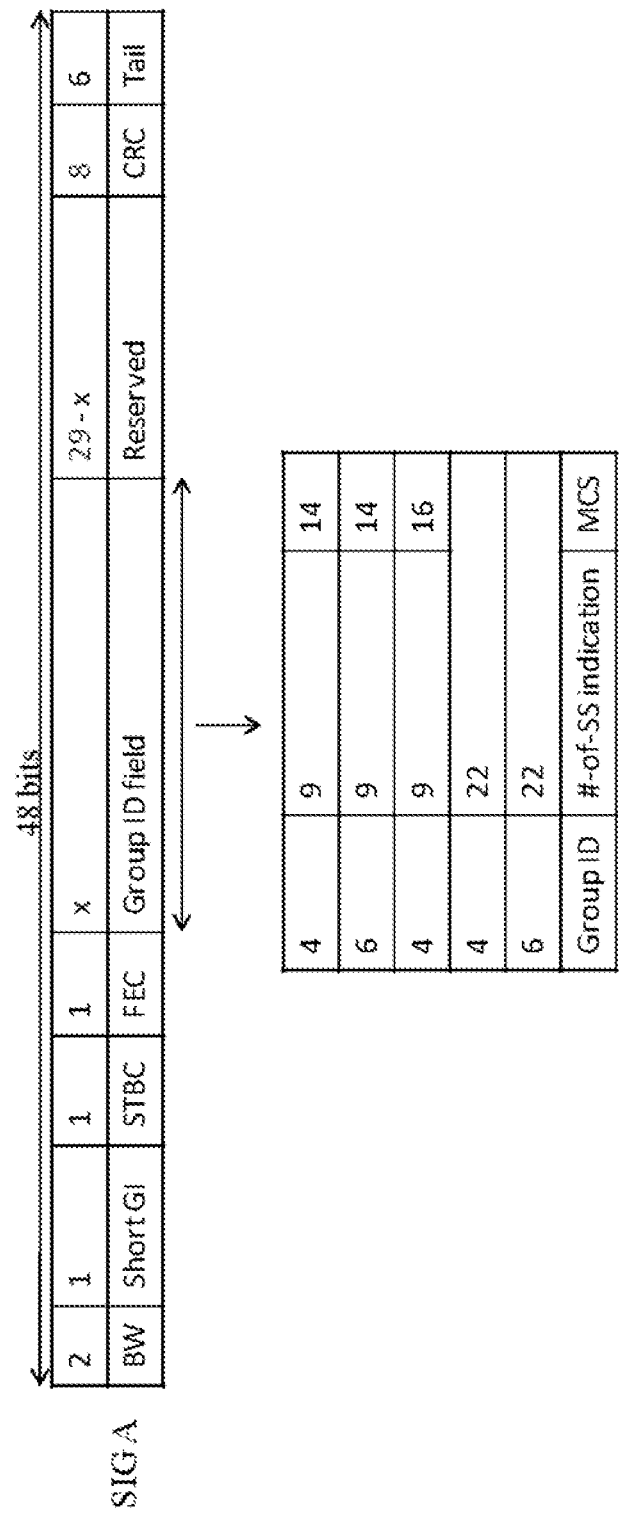

FIG. 24 is a view illustrating a twentieth example of a signal field format according to an embodiment of the present invention.

Referring to FIG. 24, the signal field in this example has a format in which the length of the CRC field has been increased from four bits to eight bits. Accordingly, the length of the reserved bit sequence may be determined as 29-x bits.

Figure 25:
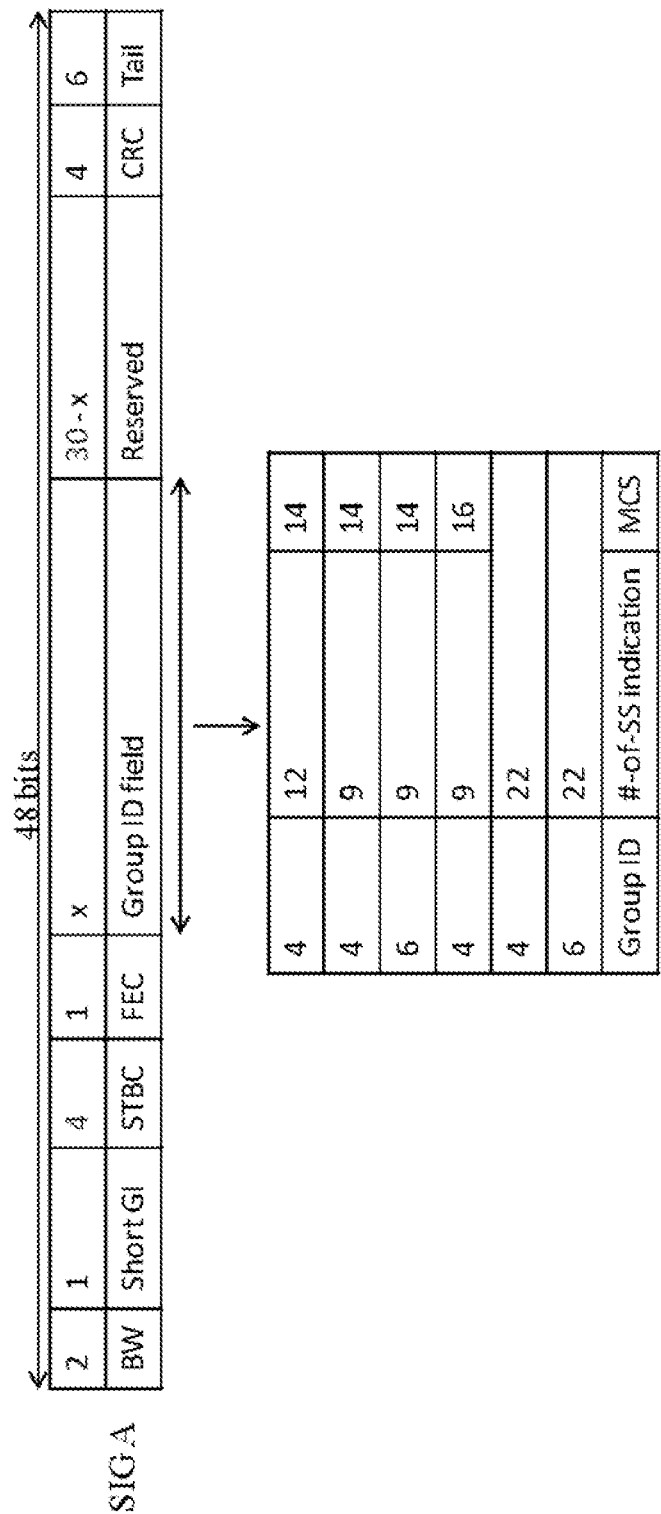

FIG. 25 is a view illustrating a twenty-first example of a signal field format according to an embodiment of the present invention.

Referring to FIG. 25, the signal field in this example has a format in which the length of the STBC field has been increased to four bits. The existing STBC field has a length of one bit and indicates whether STBC applies according to the value of the corresponding field. In contrast, the STBC field set to a length of four bits may be rendered to be able to indicate whether the STBC applies to each STA included in the transmission target STA group. If the MU-MIMO transmission scheme may support more transmission target STAs, the length of the STBC field may be further increased. Accordingly, the length of the reserved bit sequence may be determined as 30-x bits.

Figure 26:
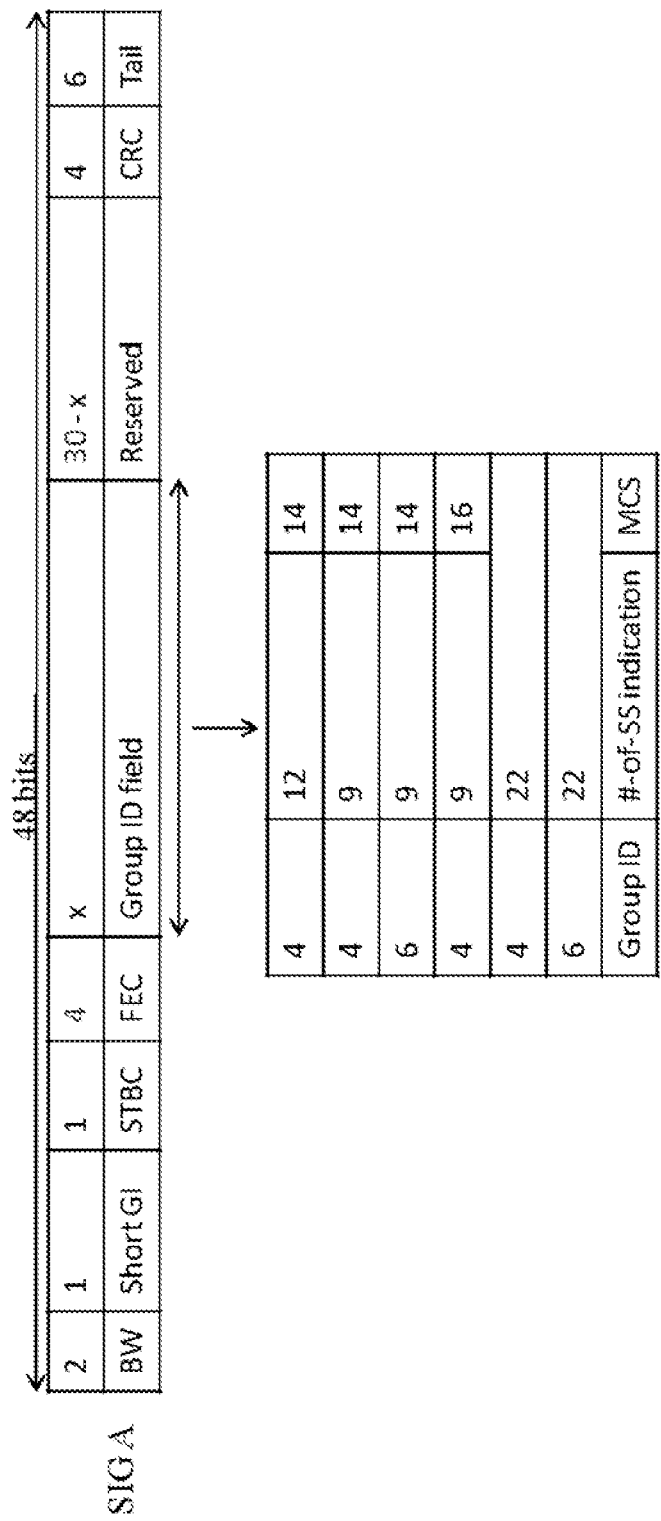

FIG. 26 is a view illustrating a twenty-second example of a signal field format according to an embodiment of the present invention.

Referring to FIG. 26, the signal field in this example has a format in which the length of the FEC field has been increased to four bits. In the signal field shown in FIG. 22, the FEC field has a length of one bit and indicates whether BCC encoding or LPDC encoding has applied according to a set value. In contrast, the 4 bits long FEC field is rendered to be able to indicate an encoding scheme that has applied to each STA included in the transmission target STA group. Accordingly, the length of the reserved bit sequence may be determined as 30-x bits.

Figure 27:
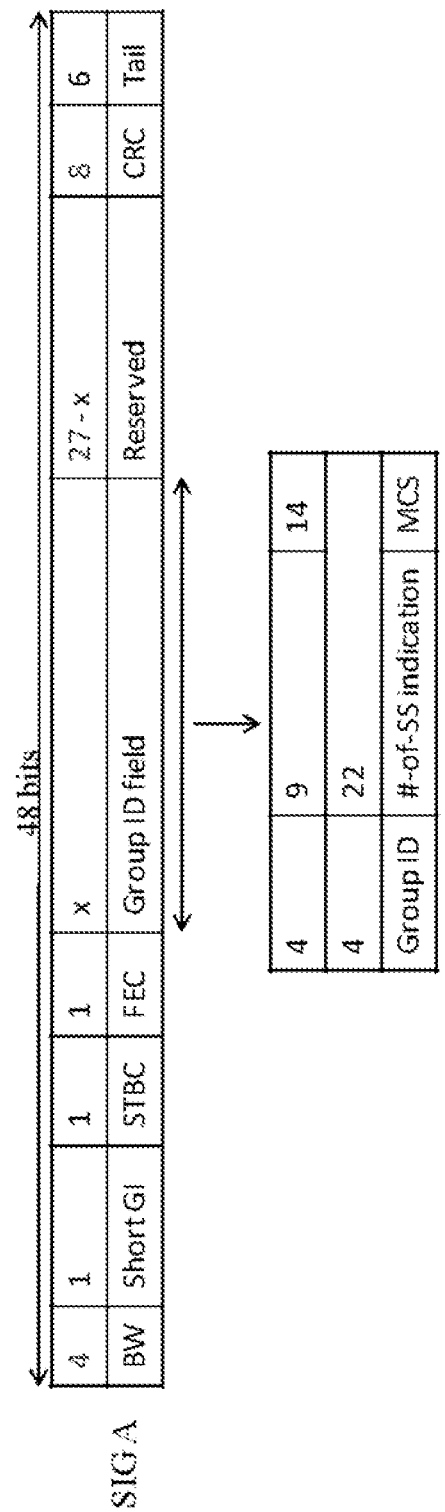

FIG. 27 is a view illustrating a twenty-third example of a signal field format according to an embodiment of the present invention.

Referring to FIG. 27, the signal field in this example has a format in which the length of the BW field is set to four bits and the length of the CRC field is set to 8 bits. Accordingly, the length of the reserved bit sequence is determined as 27-x bits.

Figure 28:
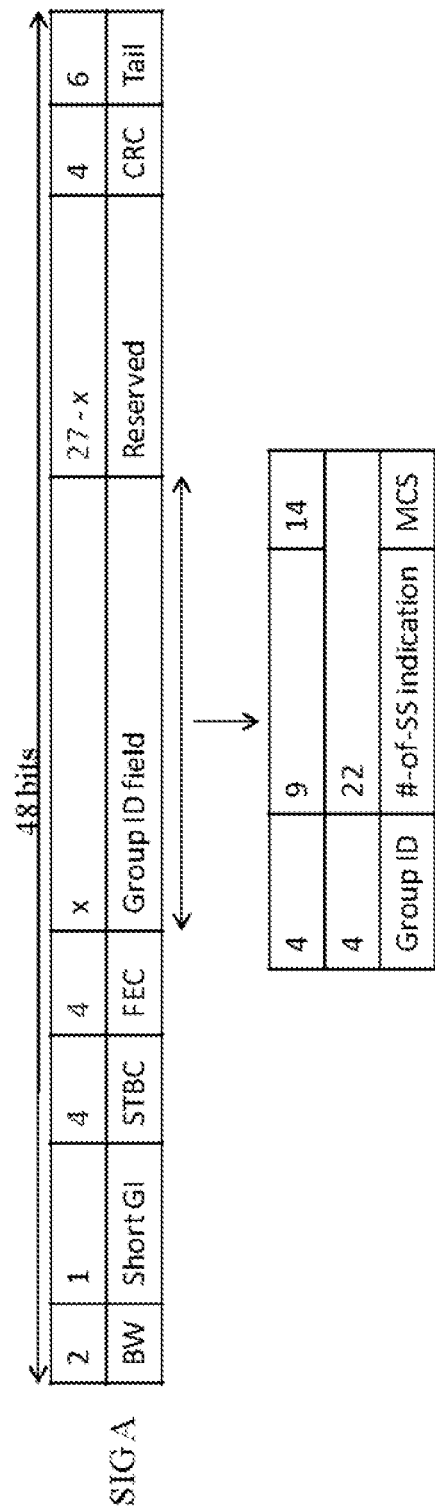

FIG. 28 is a view illustrating a twenty-fourth example of a signal field format according to an embodiment of the present invention.

Referring to FIG. 28, the signal field in this example has a format in which the STBC field and the FEC field each are set in length to 4 bits. Accordingly, the length of the reserved bit sequence is determined as 27-x bits.

Figure 29:
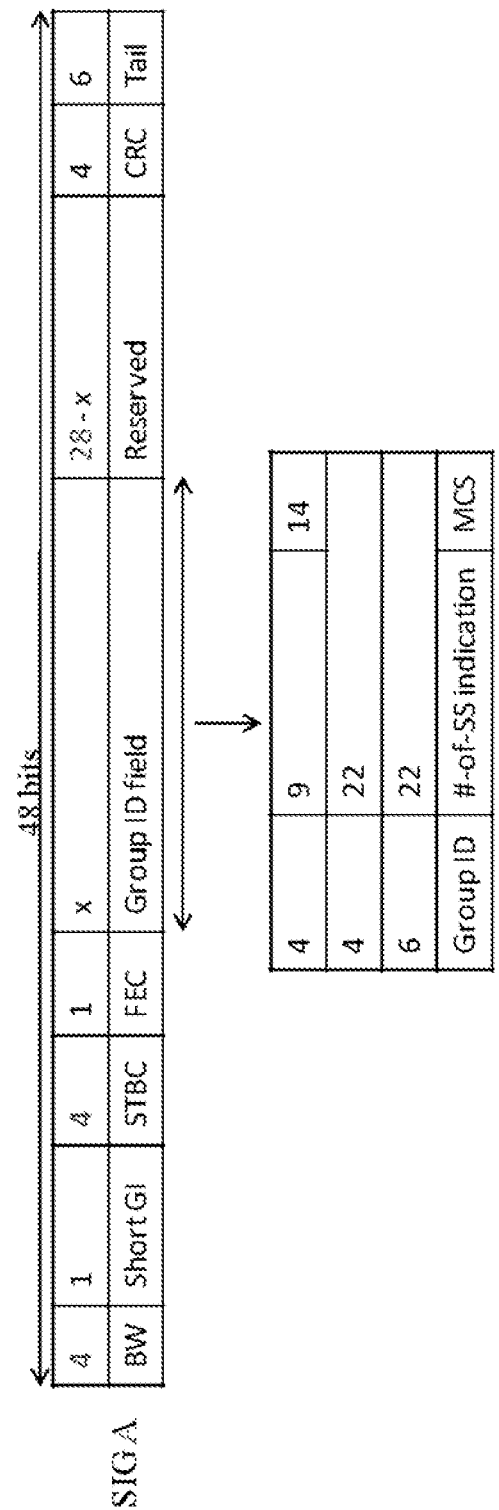

FIG. 29 is a view illustrating a twenty-fifth example of a signal field format according to an embodiment of the present invention.

Referring to FIG. 29, the signal field in this example has a format in which the BW field and the STBC field each are set in length to four bits. Accordingly, the length of the reserved bit sequence is determined as 28-x bits.

Figure 30:
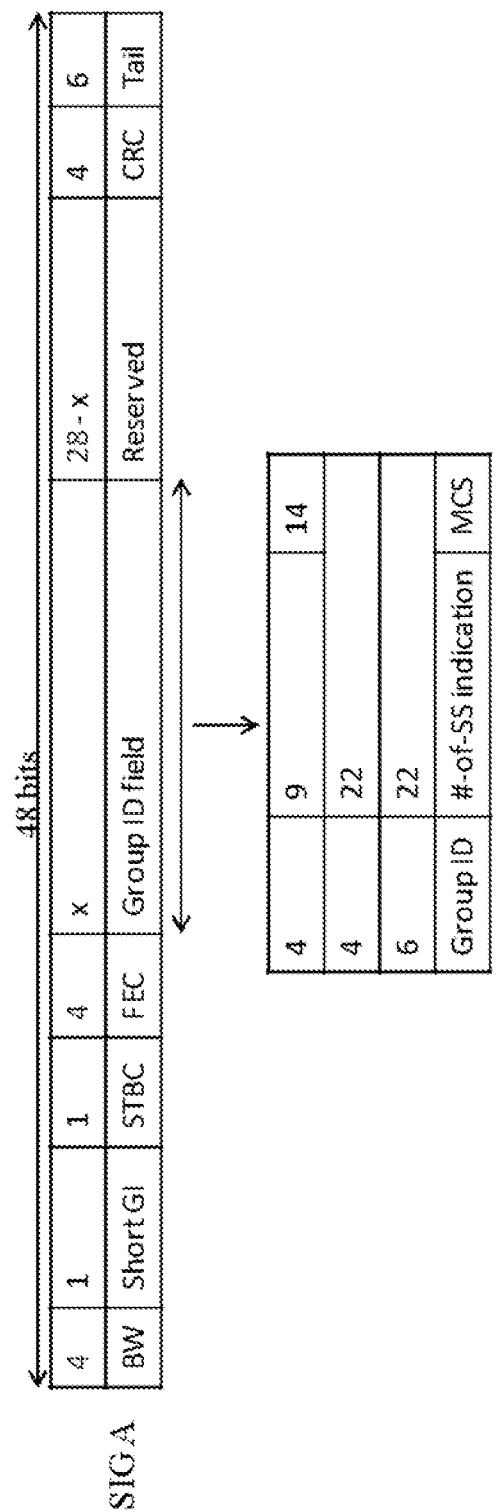

FIG. 30 is a view illustrating a twenty-sixth example of a signal field format according to an embodiment of the present invention.

Referring to FIG. 30, the signal field in this example has a format in which the BW field and the FEC field each are set in length to four bits. Accordingly, the length of the reserved bit sequence is determined as 28-x bits.

Figure 31:
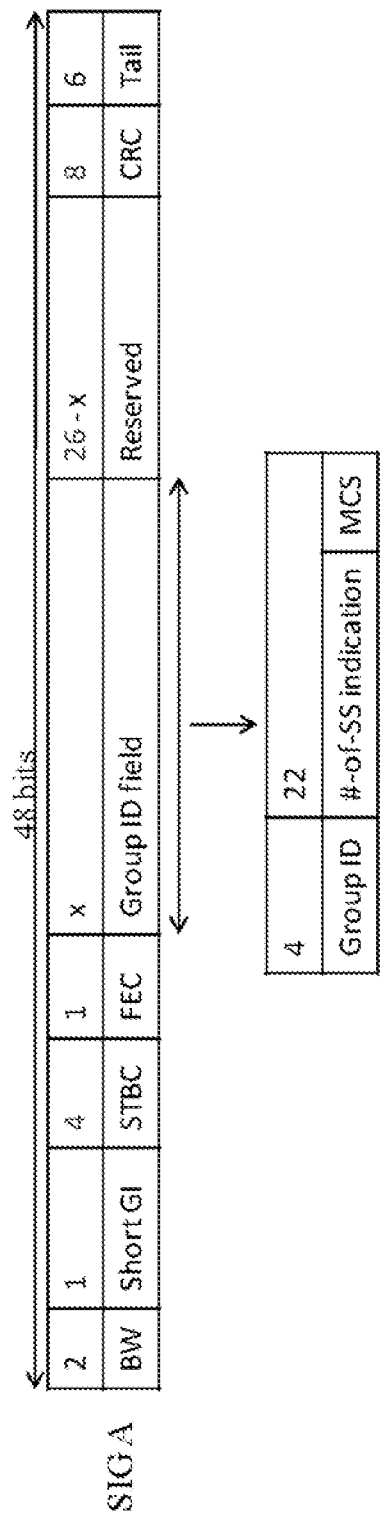

FIG. 31 is a view illustrating a twenty-seventh example of a signal field format according to an embodiment of the present invention.

Referring to FIG. 31, the signal field in this example has a format in which the STBC field and the CRC field respectively are set in length to four bits and eight bits. Accordingly, the length of the reserved bit sequence is determined as 26-x bits.

Figure 32:
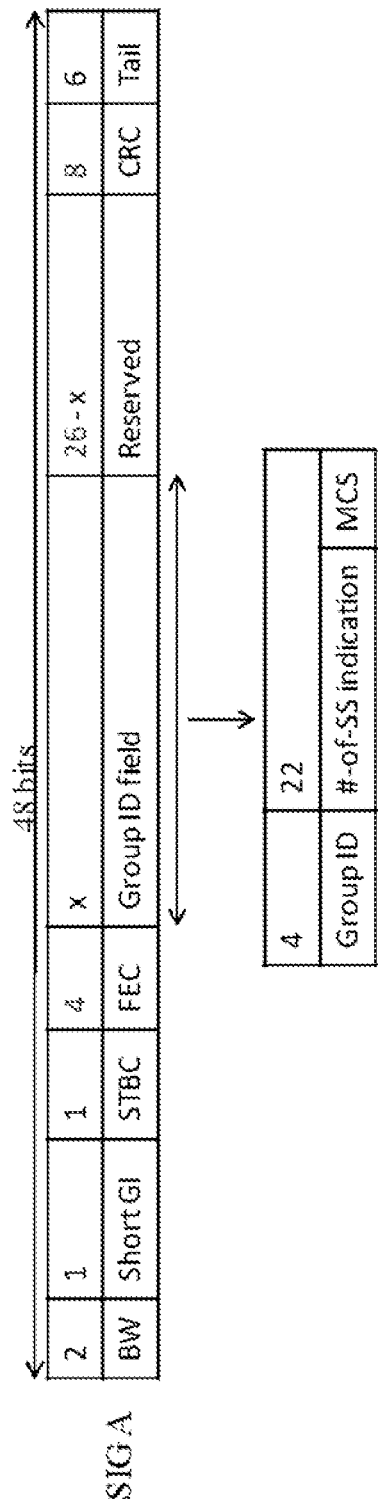

FIG. 32 is a view illustrating a twenty-eighth example of a signal field format according to an embodiment of the present invention.

Referring to FIG. 32, the signal field in this example has a format in which the FEC field and the CRC field respectively are set in length to four bits and eight bits. Accordingly, the length of the reserved bit sequence is determined as 26-x bits.

Referring to FIGS. 22 to 32, the group ID field of the signal field may have various formats. The group ID subfield included in the group ID field includes a group ID indicating a transmission target STA group. The group ID subfield may have a length of 4 bits or 6 bits.

The Nss indication subfield indicates the number of spatial streams assigned to each STA included in the transmission target STA group. The Nss indication subfield may be implemented to have a format including a plurality of subfields indicating the number of spatial streams assigned to each STA. Further, the Nss indication subfield may be implemented to be set to have an index value as exemplified in Table 2. However, in case the length of the Nss indication subfield is 12 bits or more, the Nss indication subfield may be implemented in one of the above-described two types. In contrast, in case the length is less than 12 bits, the Nss indication subfield is set to have an index value.

The group ID field further includes an MCS subfield. The MCS subfield indicates MCS information on a specific STA. The MCS subfield may include a plurality of subfields to indicate an MCS for each STA. As an example, in case four STAs are included in the transmission target STA group, the MCS subfield may include MCS for STA1, MCS for STA2, MCS for STA3 and MCS for STA4.

Figure 33:
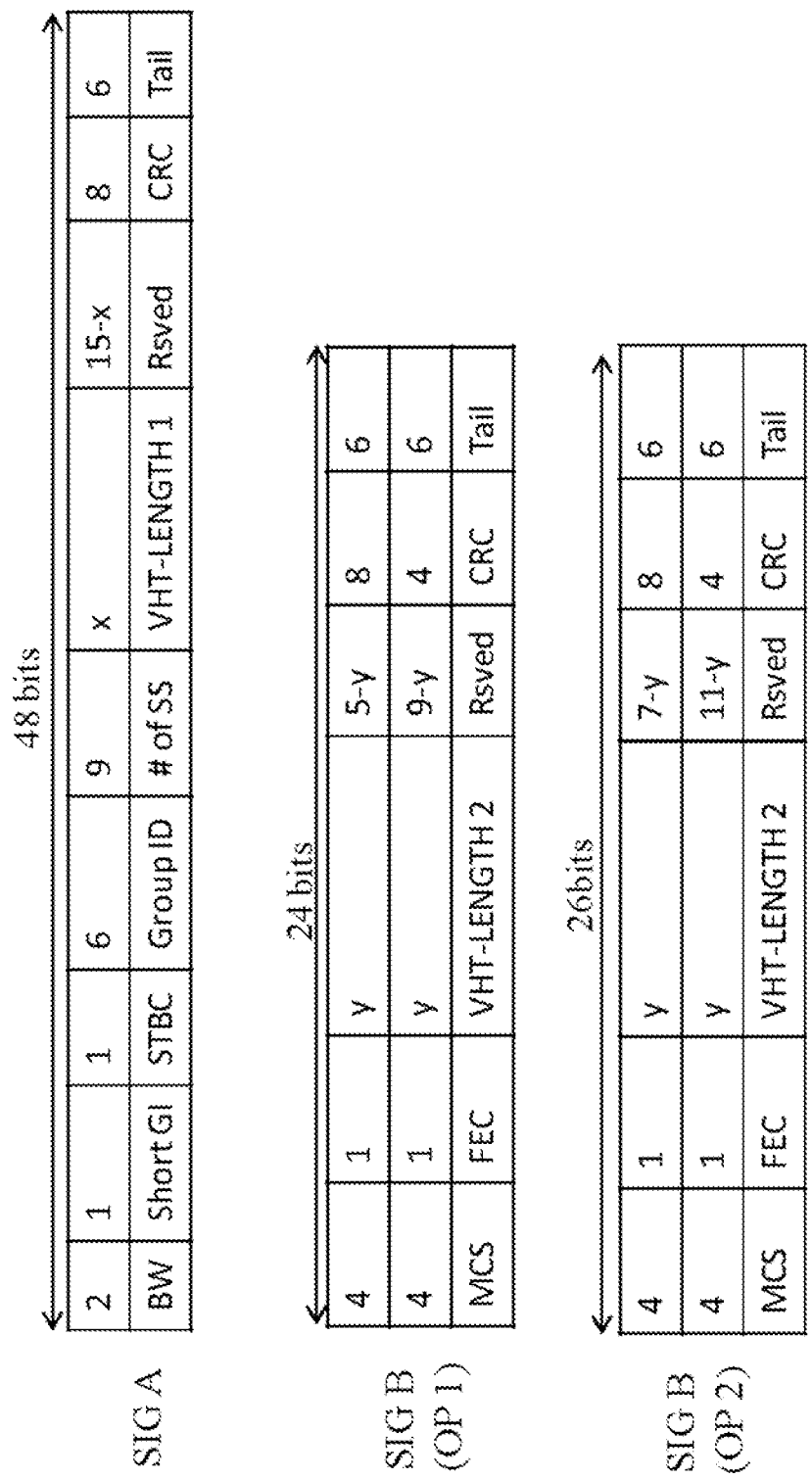

FIG. 33 is a view illustrating a twenty-ninth example of a signal field format according to an embodiment of the present invention.

Referring to FIG. 33, a signal field format is suggested to define the VHT-length field by dividing it into a VHT-SIGA field and a VHT-SIGB field. The VHT-SIGA field includes a BW field, a short GI field, an STBC field, a group ID field, an Nss field, a VHT-length 1 field, a CRC field, and a tail field. The VHT-length 1 field may be set to be x bits long. The VHT-SIGB field includes an MCS field, an FEC field, a VHT-length 2 field, a CRC field, and a tail field. The VHT-length 2 field may be set to be y bits long. The remaining fields except for the VHT-length 1 and 2 fields may be set to be the same as the corresponding fields in the existing drawings. A method of interpreting the VHT-length 1 field and the VHT-length 2 field is now described below in detail.

1) a bit sequence constituting the VHT-length 1 field and a bit sequence constituting the VHT-length 2 field may be combined and may be interpreted as a single VHT-length field. That is, a value indicated by the bit sequence is interpreted as a packet length. The packet length may be represented as the number of OFDM symbols, time unit (e.g., µs), or payload size. An example is described with reference to FIG. 34.

Figure 34:
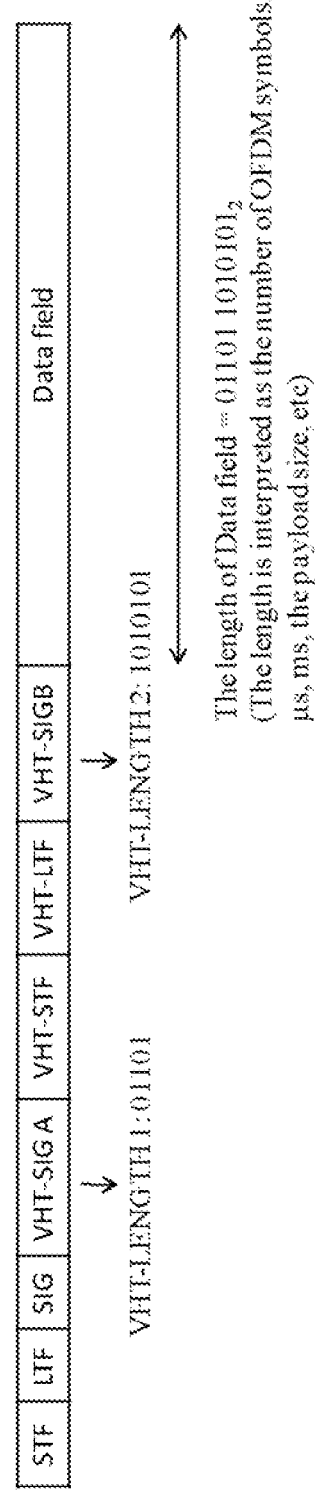
FIG. 34 is a view illustrating an example of implementing length indication information that may be applicable to an embodiment of the present invention.

FIG. 34 is a view illustrating an example of implementing length indication information that may be applicable to an embodiment of the present invention.

Referring to FIG. 34, assume that the five bits long VHT-length 1 field is set as [0, 1, 1, 0, 1], and the seven bits long VHT-length 2 field is set as [1, 0, 1, 0, 1, 0, 1]. In such case, when the receiving STA receives of the VHT-length 1 field and the VHT-length 2 field, the bit sequence as information indicating the length may be interpreted as [0, 1, 1, 0, 1, 1, 0, 1, 0, 1, 0, 1]. Accordingly, it can be seen that the length of the data field has a value corresponding to a binary number $011011010101_2$.

2) the length of the data field may be interpreted as being indicated by adjusting to a VHT-length 2 field value with respect to a VHT-length 1 field. The VHT-length 1 field is transmitted while being included in the VHT-SIGA field, and thus, may be received by all of the STAs in the transmission target STA group. The VHT-length 2 field is transmitted while being included in the VHT-SIGB field, and thus, may be set to indicate a different value to each STA. Accordingly, it is useful to indicate the length of the data field transmitted to each STA upon MU-MIMO transmission. However, a value indicated by a combination of the VHT-length 1 field and the VHT-length 2 field may be represented as the number of OFDM symbols, time unit (e.g., µs), or payload size. An example is described in connection with FIG. 35.

Figure 35:
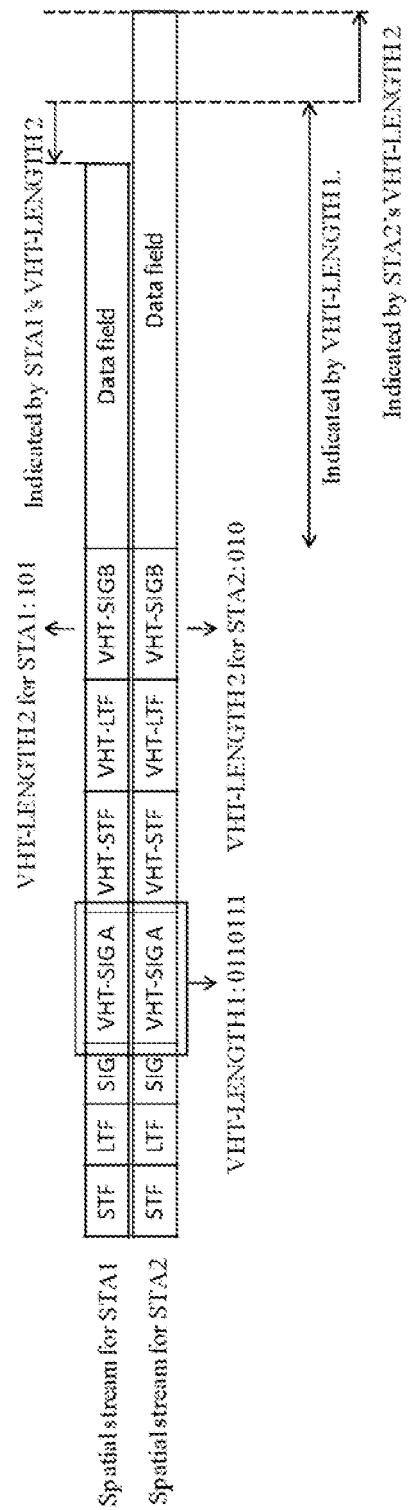
FIG. 35 is a view illustrating another example of implementing length indication information that may be applicable to an embodiment of the present invention.

FIG. 35 is a view illustrating another example of implementing length indication information that may be applicable to an embodiment of the present invention.

Referring to FIG. 35, assume that the seven bits long VHT-length 1 field is set as [0, 1, 1, 0, 1, 1, 1] and the three bits long VHT-length 2 field is set as [1, 0, 1] for STA1 and as [0, 1, 0] for STA2. STA1 and STA2 are MU-MIMO paired STAs and are included in the transmission target STA group.

The length of the data field transmitted to each STA may be interpreted as $101_2/010_2$ with respect to $0110111_2$. At this time, the VHT-length 2 field value may be implemented as being + operated or − operated. In case the value is set as being + operated, the data field for STA1 has a length of $0110111_2+101_2$ and the data field for STA2 has a length of $0110111_2+010_2 010_2$.

The signal field applicable to an embodiment of the present invention as suggested with reference to FIGS. 5 to 21 is an example of including a VHT-SIGA field and a VHT-SIGB field. At this time, the FEC subfield indicating an encoding scheme as applied is included in the VHT-SIGB field. It is because supportable encoding/decoding scheme may change depending on capability of the receiving STA. In case the FEC field is included in the VHT-SIGB field, the AP and/or transmitting STA may indicate an encoding scheme applied by naturally setting an FEC subfield value to fit the capability of the receiving STA. In a method of indicating the encoding scheme, if the FEC subfield value is 0, BCC encoding may be indicated, and if the FEC subfield value is 1, LDPC encoding may be indicated, and vice versa.

For example, assume that the MU-MIMO-based transmission target STA group includes STA1, STA2, STA3, and STA4. Although STA1 and STA2 support both BCC encoding and LDPC encoding schemes, STA3 and STA4 may support BCC encoding scheme alone. In such case, the FEC subfield of the VHT-SIGB field intended to be transmitted to STA1 and STA2 may be set to indicate one of the BCC encoding and LDPC encoding schemes, and the FEC subfield of the VHT-SIGB field intended to be transmitted to STA3 and STA4 is set to indicate the BCC encoding scheme. Receiving the VHT-SIGB field, the STA may detect/decode data according to BCC or LDPC scheme based on the FEC subfield value.

Meanwhile, latency may occur when the FEC subfield is included in the VHT-SIGB field. That is, this is why decoding data may not be initiated before the FEC subfield value in the VHT-SIGB field is known. To address this, the FEC subfield may be included in the VHT-SIGA field.

To support MU-MIMO, as much length indication information as the number of MU-MIMO transmission target STAs should be included in the VHT-SIGA field. Due to this, unless a sufficient space is provided in the VHT-SIGA field, a one bit long FEC subfield may be included in the VHT-SIGA field. In such case, it is suggested how to support MU-MIMO of STAs having various capability values.

The one bit long FEC subfield may back up the following three instances. Assume that among STAs, an STA supporting LDPC encoding may support BCC encoding as well. The FEC subfield being 0 means the BCC schemes, and the FEC subfield being 1 means the LDPC scheme.

Case 1: In Case all STAs in the Group Supports BCC Encoding Only

Assume that the AP transmits data to STA1, STA2, STA3, and STA4 through MU-MIMO. At this time, all the STAs have BCC capability values. A transmitter transmits the FEC subfield of the VHT-SIGA field with the FEC subfield set as 0. Transmission target STAs, i.e., STA1, STA2, STA3, and STA4, all decode the data corresponding to the BCC encoding scheme.

Case 2: In Case all STAs in the Group Support LDPC Encoding

Assume that the AP transmits data to STA1, STA2, STA3, and STA4 through MU-MIMO. At this time, all the STAs have LDPC capability values. The AP transmits the FEC subfield of the VHT-SIGA field with the FEC subfield set as 1. Transmit target STAs, i.e., STA1, STA2, STA3, and STA4, all decode the data corresponding to the LDPC encoding scheme.

Case 3: In Case Some of all STAs in the Group Support LDPC Encoding

Assume that the AP transmits data to STA1, STA2, STA3, and STA4 through MU-MIMO. At this time, some STAs have LDPC capability values. For example, STA1 and STA2 have LDPC capability values. At this time, the AP transmits the FEC field of the VHT-SIGA field with the FEC field set as 1. STA1 and STA2 support LDPC encoding and thus decode the data corresponding to LDPC encoding. In the case of STA3 and STA4, although the FEC subfield value means LDPC encoding, their capability values support BCC encoding only, and thus, the FEC subfield value is disregarded. In other words, an STA, when information indicating a coding scheme not supportable by the STA is included in the VHT-SIGA field, disregards the value and decodes data corresponding to a coding scheme supportable by its capability value.

To support the above schemes, the formats of the VHT-SIGA field and the VHT-SIGB field as suggested in FIGS. 5 to 21 should be modified. That is, the FEC subfield is included in the VHT-SIGA field, and the length of the reserved bit sequence is reduced. Further, the FEC subfield is excluded from the VHT-SIGB field, and the length of the partial AID subfield or reserved bit sequence is increased. Similarly, like the formats shown in FIGS. 22 to 25, 27, 29, and 31, the signal field is implemented with only the VHT-SIGA field without the VHT-SIGB field, and the length of the FEC field is likewise specified as one bit. With the one bit long FEC subfield as suggested above, MU-MIMO may be supported in a system constituted of heterogeneous devices.

Figure 36:
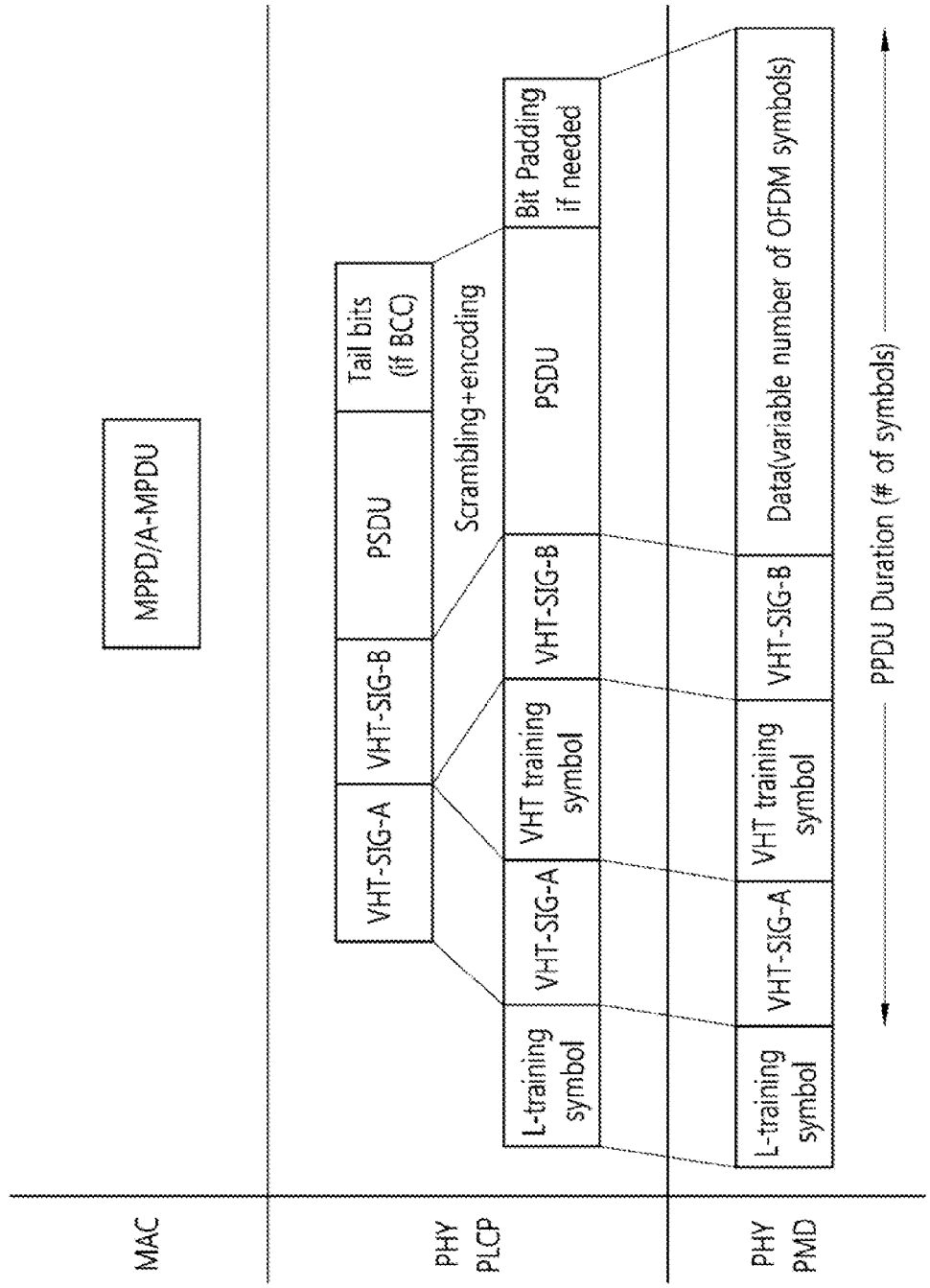
FIG. 36 is a view illustrating an example of a Tx procedure based on a PPDU format according to an embodiment of the present invention.

FIG. 36 is a view illustrating an example of a Tx procedure based on a PPDU format according to an embodiment of the present invention.

Referring to FIG. 36, an MAC layer transfers a generated MPDU or A-MPDU to a PLCP sublayer. In the PLCP sublayer, the MPDU or A-MPDU is referred to as PSDU. The PLCP sublayer transmits the PSDU to another STA through a PHY layer and adds necessary control information for the other STA to receive, demodulate, and decode a corresponding PPDU to thereby obtain the data. The corresponding control information may be included in the VHT-SIGA field and the VHT-SIGB field. A type-of-encoder (in case of BCC encoder) tail field may be added. The control information may be included in the VHT-SIGA field and the VHT-SIGB field. Although not shown, in case only the VHT-SIGA field is implemented as the signal field, the corresponding control information is included in the VHT-SIGA field. Refer to FIGS. 5 to 33 for the formats of the VHT-SIGA field and the VHT-SIGB field.

The PLCP sublayer may add training symbols for antenna diversity acquisition, and timing acquisition and wireless resource synchronization between a transmitting AP and/or STA and a receiving STA. This may be implemented by adding VHT training symbols including a VHT-STF and a VHT-LTF necessary for demodulating and decoding the data field and the VHT-SIGB field transmitted through an MIMO channel and legacy training symbols including the L-STF and L-LTF necessary for demodulating and decoding the VHT-SIGA field.

The PPDU transmitted through a wireless resource is mapped with an OFDM symbol and is transmitted through a wireless resource. Here, the PPDU and/or the data field in the PPDU mapped with the OFDM symbol may be implemented to have a specific bit size and may be implemented to have a bit size of a multiple of the above-described Octet. Accordingly, in case the bit size is not enough to supplement the bit size of the PPDU and/or data field, a padding bit may be added to adjust the overall bit size of the PPDU and/or data field.

The PPDU generated in Tx procedure includes a preamble for STA, a signal field (VHT-SIGA and/or VHT-SIGB) including control information, a service field, a PSDU, a tail field, and a data field including the padding field. The generated PPDU is mapped with an OFDM symbol and may be transmitted to at least one or more destination STAs MIMO paired with each other.

Figure 37:
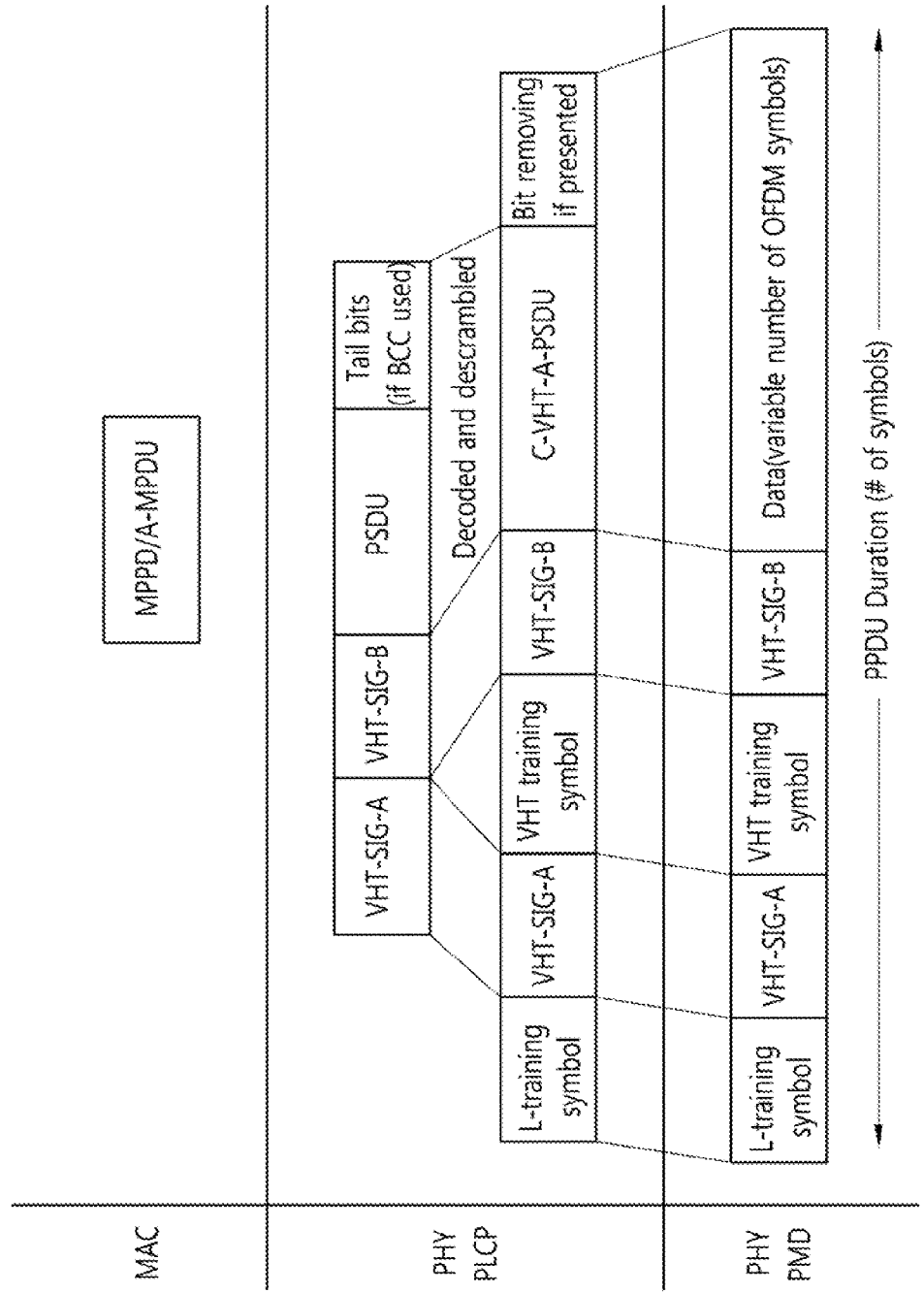
FIG. 37 is a view illustrating an example of an Rx procedure for a PPDU generated according to an embodiment of the present invention.

FIG. 37 is a view illustrating an example of an Rx procedure for a PPDU generated according to an embodiment of the present invention.

Referring to FIG. 37, the receiving STA obtains timing synchronization and channel information based on the L-preamble and VHT-preamble and obtains control information included in the signal field. The STA demodulates and decodes the data field diagnosis through each spatial stream based on the control information and transmits the PSDU to the MAC layer.

Figure 38:
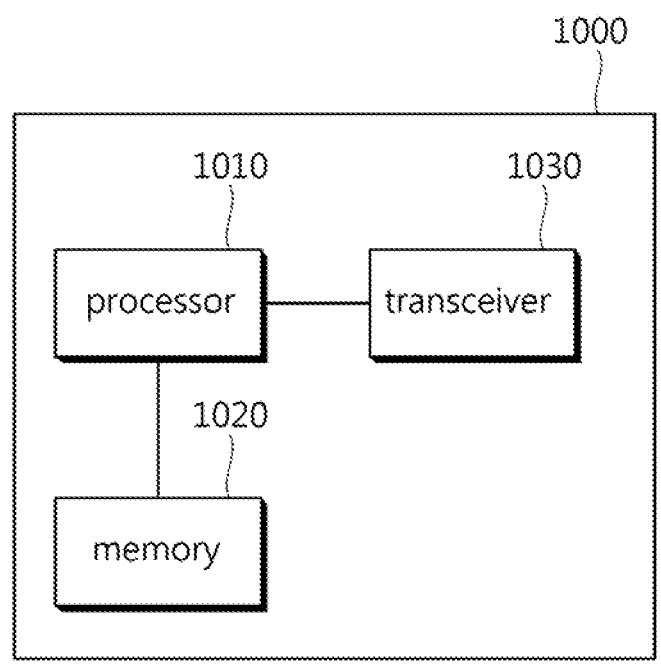
FIG. 38 is a block diagram illustrating a wireless device to which an embodiment of the present invention may be applicable.

FIG. 38 is a block diagram illustrating a wireless device to which an embodiment of the present invention may be applicable. The wireless devices may be an AP or an STA.

A wireless device 1000 includes a processor 1010, a memory 1020, and a transceiver 1030. Transceiver 1030 transmits/receives a wireless signal. An IEEE 802.11 based physical layer is implemented in transceiver 1030. Processor 1010 is functionally coupled with the transceiver 1030 and implements an IEEE 802.11 MAC layer and physical layer. Processor 1010 may be configured to generate a PPDU format as suggested herein and configured to transmit the PPDU format. Processor 1010 may also be configured to receive the transmitted PPDU, configured to interpret field values therein to obtain control information, and configured to obtain data using the control information. The processor may be configured to implement the embodiments of the present invention described above in connection with FIGS. 2 to 37.

Processor 1010 and/or transceiver 1030 may include ASICs (application-specific integrated circuits), other chipsets, logical circuits and/or data processing devices. Memory 1020 may include a ROM (read-only memory), a RAM (random access memory), a flash memory, a memory card, a storage medium and/or other storage devices. When the embodiments are implemented in software, the above-described schemes may be embodied in modules (procedures or functions). The modules may be stored in memory 1020 and may be executed by processor 1010. Memory 1020 may be positioned in or outside processor 1010 and may be connected to processor 1010 through various known means.

The embodiments described above are merely provided as examples to introduce the technical spirit of the present invention, and the technical spirit of the present invention should not be limited thereto. The scope of the present invention is defined by the appended claims.

The invention claimed is:

1. A method for transmitting data by a transmitter in a wireless local area network, the method comprising:
   determining a type of a physical layer protocol data unit (PPDU) based on a number of receivers to receive the PPDU;
   if the number of receivers is equal to one, transmitting a single user (SU)-type PPDU to a single receiver; and
   if the number of receivers is greater than one, transmitting a multi user (MU)-type PPDU to a plurality of receivers,
   wherein the SU-type PPDU includes a single signal field, a first SU long training field (LTF), a second SU LTF and a SU data portion; and
   wherein the MU-type PPDU includes two signal fields, a first MU LTF, a second MU LTF and a MU data portion, the two signal fields including a first MU signal field and a second MU signal field.

2. The method of claim 1, wherein the single signal field and the first MU signal field respectively include a bandwidth field indicating a bandwidth in which a corresponding PPDU is transmitted.

3. The method of claim 2, wherein the single signal field further includes a modulation and coding scheme (MCS) field indicating a MCS for the single receiver.

4. The method of claim 3, wherein the second MU signal field includes a MCS field indicating a MCS per receiver.

5. The method of claim 2, wherein the first MU signal field further includes an identifier field indicating that the MU-type PPDU is transmitted by using a MU-multiple input multiple output (MIMO) transmission.

6. A device for a wireless local area network, the device comprising:
   a transceiver configured to transmit radio signals; and
   a processor operatively coupled with the transceiver and configured to:
   determine a type of a physical layer protocol data unit (PPDU) based on a number of receivers to receive the PPDU;
   instruct the transceiver to transmit a single user (SU)-type PPDU to a single receiver if the number of receivers is equal to one; and
   instruct the transceiver to transmit a multi user (MU)-type PPDU to a plurality of receivers if the number of receivers is greater than one,
   wherein the SU-type PPDU includes a single signal field, a first SU long training field (LTF), a second SU LTF and a SU data portion; and
   wherein the MU-type PPDU includes two signal fields, a first MU LTF, a second MU LTF and a MU data portion, the two signal fields including a first MU signal field and a second MU signal field.

7. The device of claim 6, wherein the single signal field and the first MU signal field respectively include a bandwidth field indicating a bandwidth in which a corresponding PPDU is transmitted.

8. The device of claim 7, wherein the single signal field further includes a modulation and coding scheme (MCS) field indicating a MCS for the single receiver.

9. The device claim 8, wherein the second MU signal field includes a MCS field indicating a MCS per receiver.

10. The device of claim 7, wherein the first MU signal field further includes an identifier field indicating that the MU-type PPDU is transmitted by using a MU-multiple input multiple output (MIMO) transmission.

\* \* \* \* \*